United States Patent
Taka et al.

(10) Patent No.: US 12,422,383 B2
(45) Date of Patent: *Sep. 23, 2025

(54) IMAGING UNIT, RADIOLOGICAL IMAGE ACQUISITION SYSTEM, AND RADIOLOGICAL IMAGE ACQUISITION METHOD

(71) Applicant: HAMAMATSU PHOTONICS K.K., Hamamatsu (JP)

(72) Inventors: Tetsuya Taka, Hamamatsu (JP); Toshiyasu Suyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 228 days.

This patent is subject to a terminal disclaimer.

(21) Appl. No.: 18/025,215

(22) PCT Filed: Aug. 10, 2021

(86) PCT No.: PCT/JP2021/029559
§ 371 (c)(1),
(2) Date: Mar. 8, 2023

(87) PCT Pub. No.: WO2022/085275
PCT Pub. Date: Apr. 28, 2022

(65) Prior Publication Data
US 2023/0258580 A1    Aug. 17, 2023

(30) Foreign Application Priority Data

Oct. 23, 2020   (JP) .................................. 2020-178258

(51) Int. Cl.
*G01N 23/04* (2018.01)
*G01N 23/083* (2018.01)

(52) U.S. Cl.
CPC ........... *G01N 23/04* (2013.01); *G01N 23/083* (2013.01); *G01N 2223/505* (2013.01); *G01N 2223/643* (2013.01)

(58) Field of Classification Search
CPC ................. G01N 23/04; G01N 23/083; G01N 2223/505; G01N 2223/643;
(Continued)

(56) References Cited

U.S. PATENT DOCUMENTS 5,864,146 A      1/1999  Karellas
10,859,715 B2 *  12/2020 Sugiyama ................ G01T 1/20
(Continued)

FOREIGN PATENT DOCUMENTS

JP      2001-124530 A    5/2001
JP         4063324 B2    3/2008
(Continued)

OTHER PUBLICATIONS

International Preliminary Report on Patentability mailed May 4, 2023 for PCT/JP2021/029559.

*Primary Examiner* — Courtney D Thomas
(74) *Attorney, Agent, or Firm* — Faegre Drinker Biddle & Reath LLP

(57) ABSTRACT

An imaging unit includes a housing having an entrance window that allows radiation transmitted through an object to pass through, a scintillator having an input surface to which radiation passing through the entrance window is input, and a line scan sensor having an imaging surface that captures an image of scintillation light output from the input surface. The imaging unit further includes a slit member placed between the entrance window and the scintillator and configured to guide radiation passing through the entrance window toward the input surface and a 1×lens placed between the scintillator and the line scan sensor and con-
(Continued)

figured to form scintillation light output from the input surface into an image on the imaging surface of the line scan sensor.

11 Claims, 18 Drawing Sheets

(58) Field of Classification Search
CPC .......... G01N 2223/3308; G01N 23/10; G01N 23/18; G01N 2223/3307; G01N 2223/639; G01N 2223/652; G01V 5/22; G01V 5/226
See application file for complete search history.

(56) References Cited

U.S. PATENT DOCUMENTS

| | | | |
|---|---|---|---|
| 11,237,278 B2 * | 2/2022 | Sugiyama | ................. G01T 1/20 |
| 12,058,472 B2 * | 8/2024 | Sugiyama | .............. G01N 23/04 |

FOREIGN PATENT DOCUMENTS

| | | |
|---|---|---|
| JP | 2009-085844 A | 4/2009 |
| JP | 2016-011957 A | 1/2016 |
| JP | 2016-210501 A | 12/2016 |
| JP | 2017-036954 A | 2/2017 |
| JP | 2018-141673 A | 9/2018 |
| JP | 2020-139816 A | 9/2020 |
| JP | 2020-160079 A | 10/2020 |
| WO | WO-2020/174849 A1 | 9/2020 |
| WO | WO-2020/174850 A1 | 9/2020 |
| WO | WO-2023/017664 A1 | 2/2023 |

* cited by examiner

Fig.5
(a)
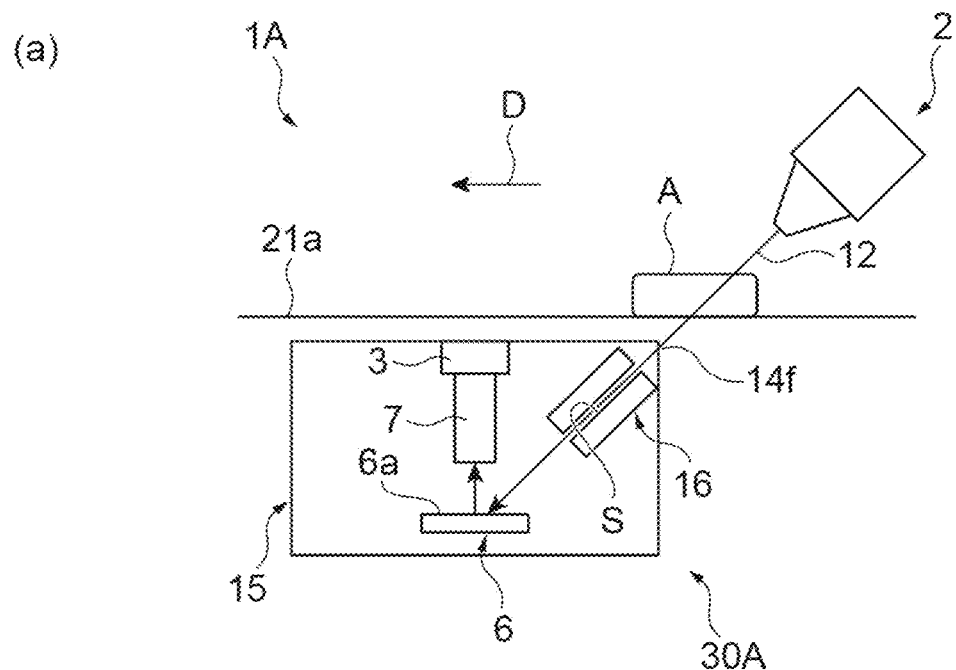
(b)
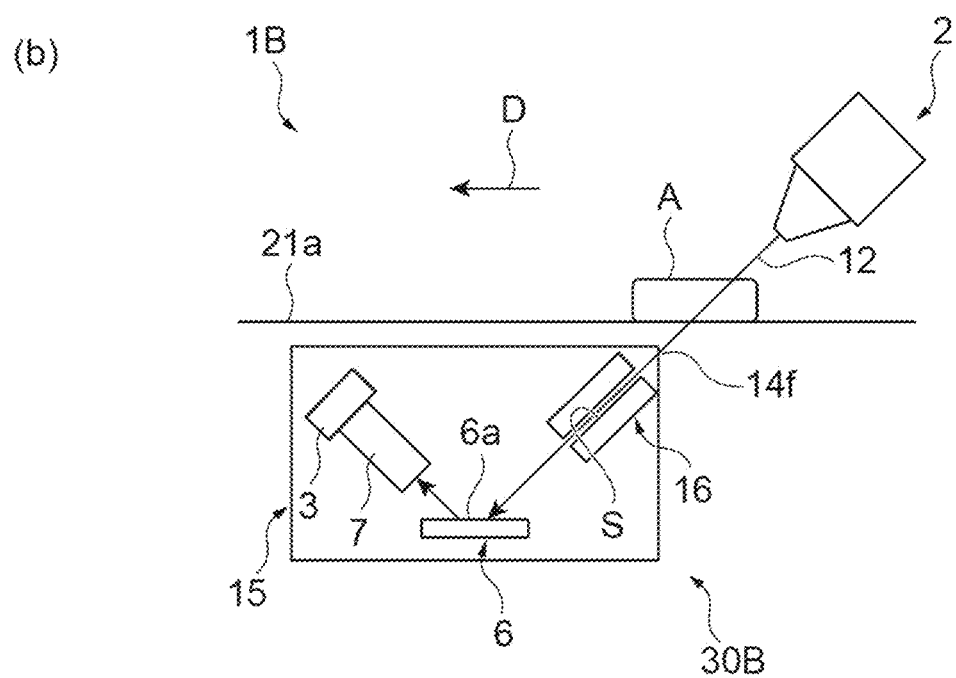

Fig.6
(a)
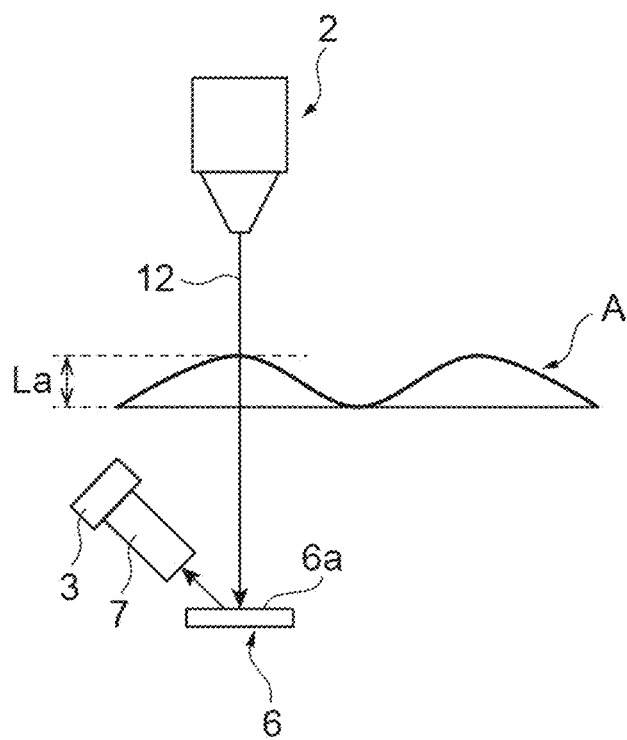
(b)
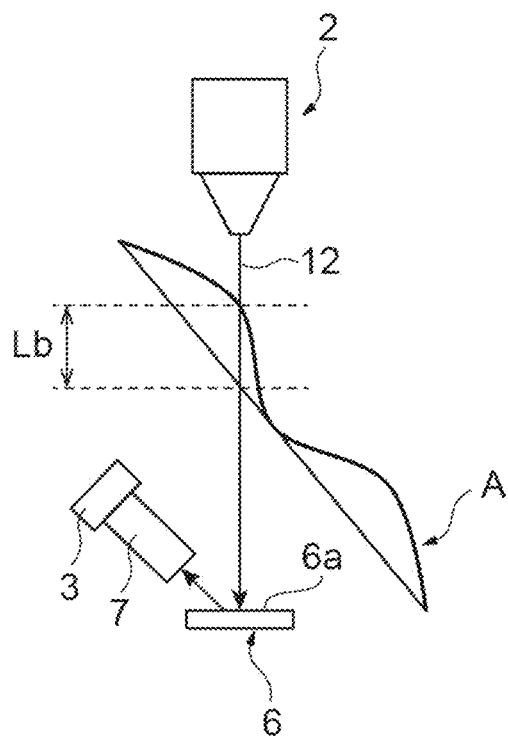

*Fig.8*
(a)
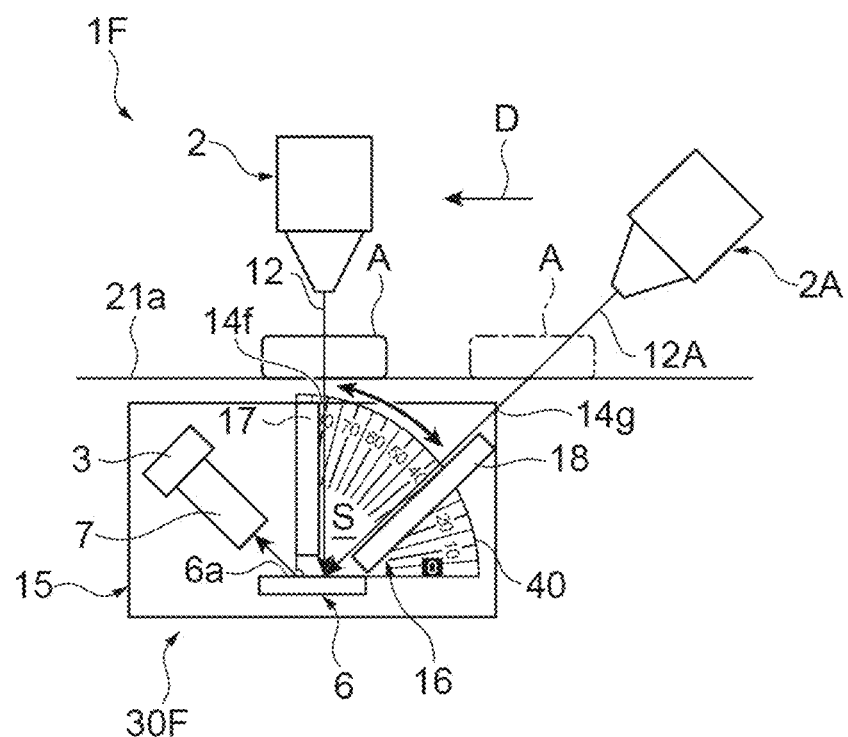
(b)
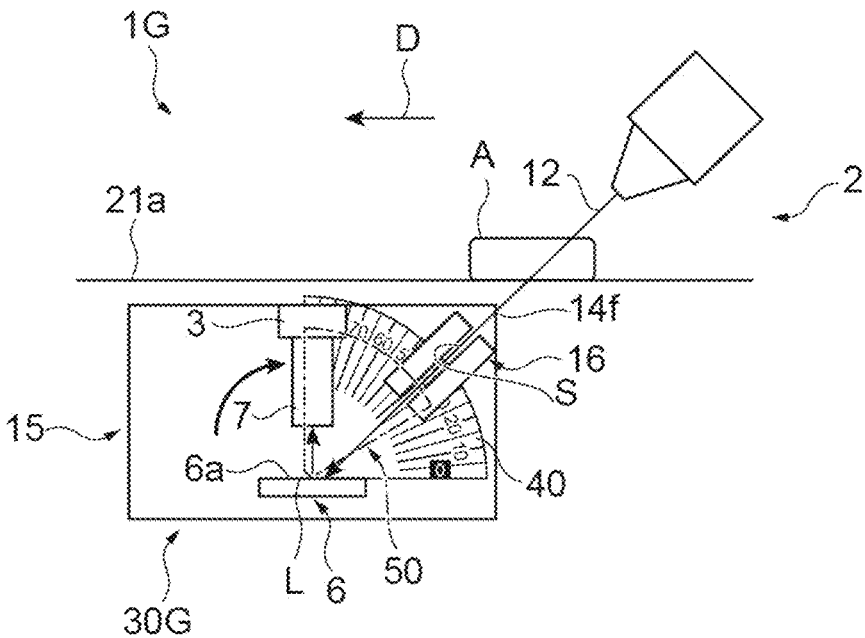

Fig.9
(a)
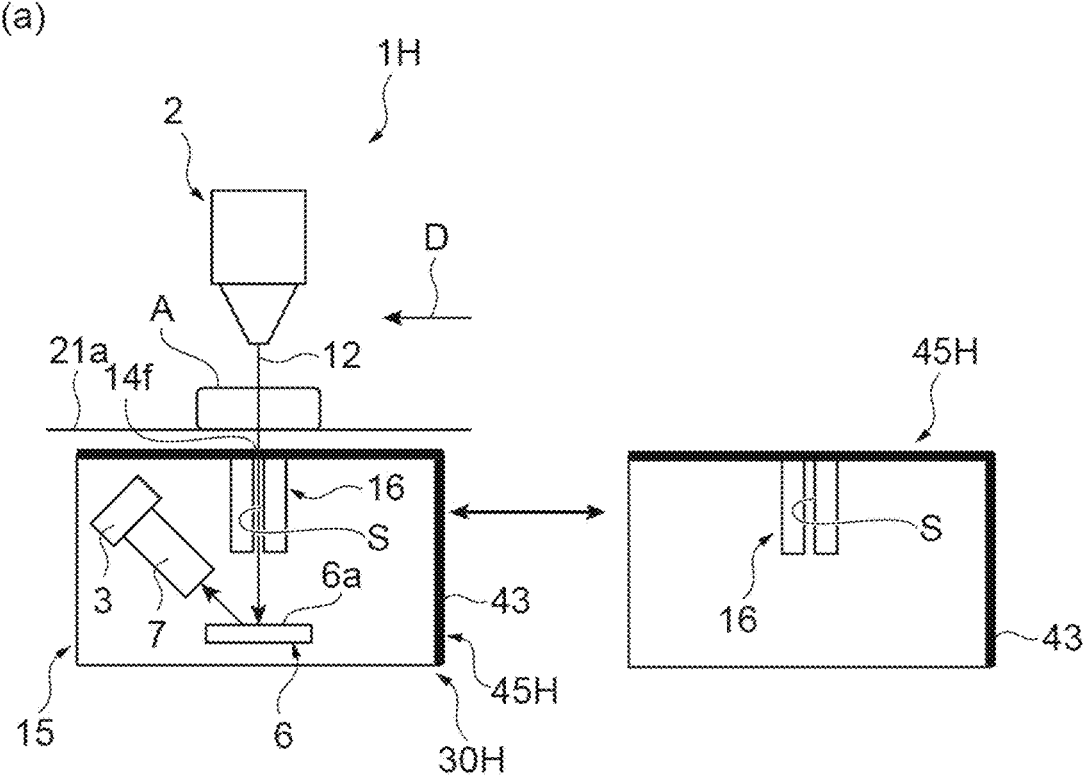
(b)
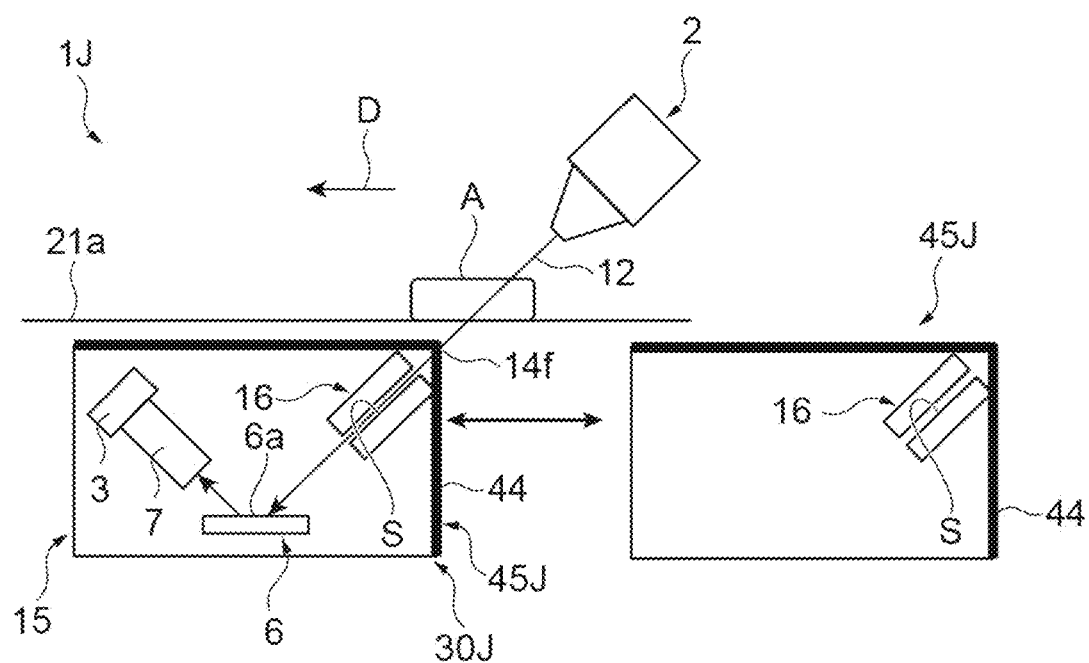

Fig.10 (a)
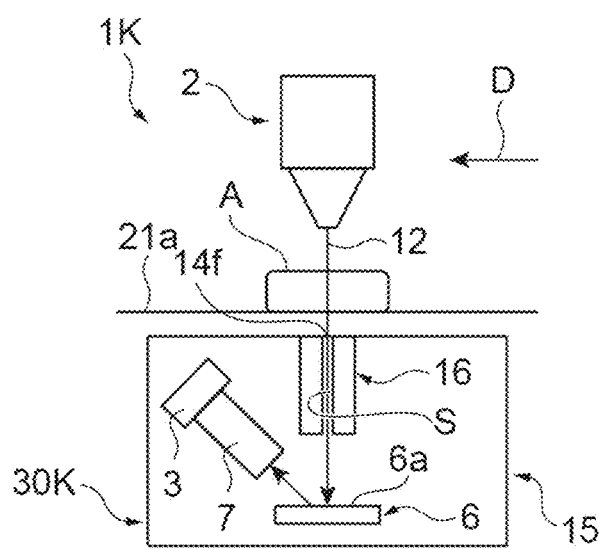
(b)
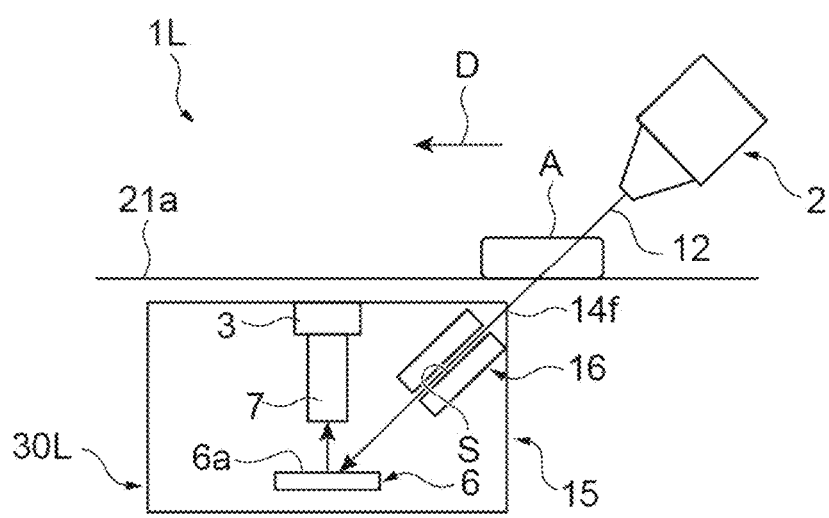
(c)
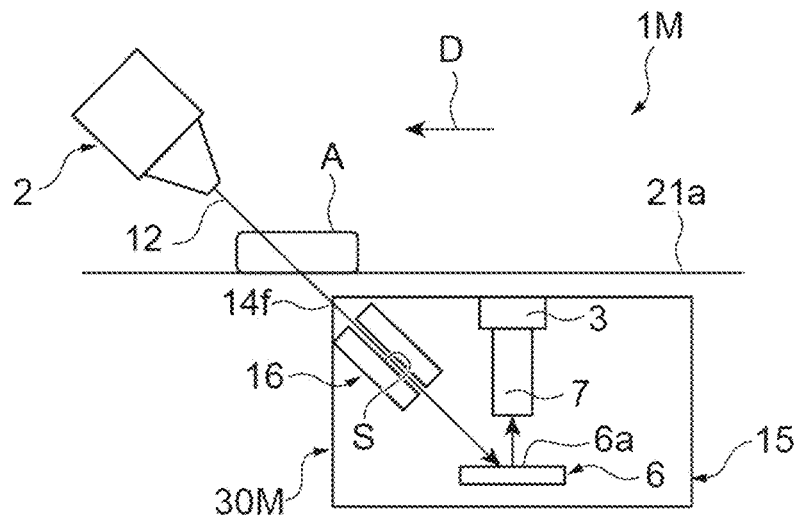

Fig.16

|  | Example 1 | Example 2 | Comparative Example |
|---|---|---|---|
| Total pixel count of image (pixels) | 5888000 | 5888000 | 5888000 |
| Pixel count of scattered X-rays (pixels) | 206 | 507 | 1299 |
| Ratio of scattered X-rays (%) | 0.003 | 0.009 | 0.022 |
| Lead plate around housing | Present | Present | Present |
| Lower surface of scintillator | Lead | Lead | Lead |
| Copper plate slit portion | Present | Present | Absent |
| Lead-containing glass of sensor | Present | Absent | Absent |

*Fig.17*
(a)
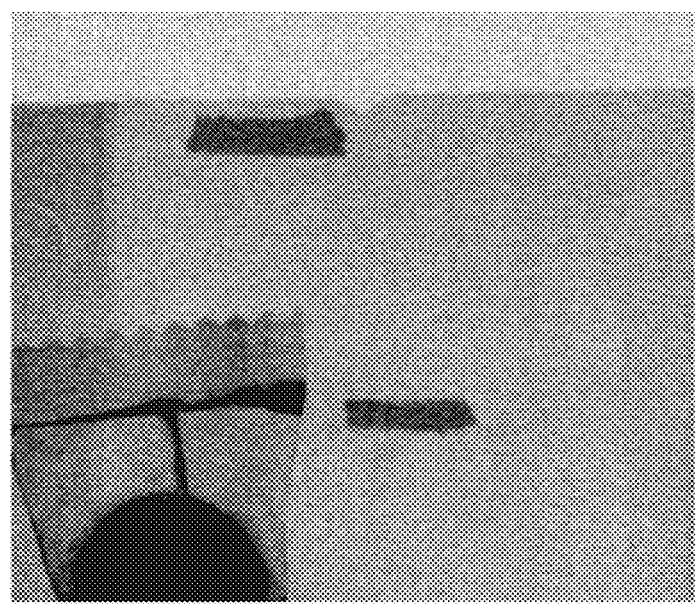
(b)
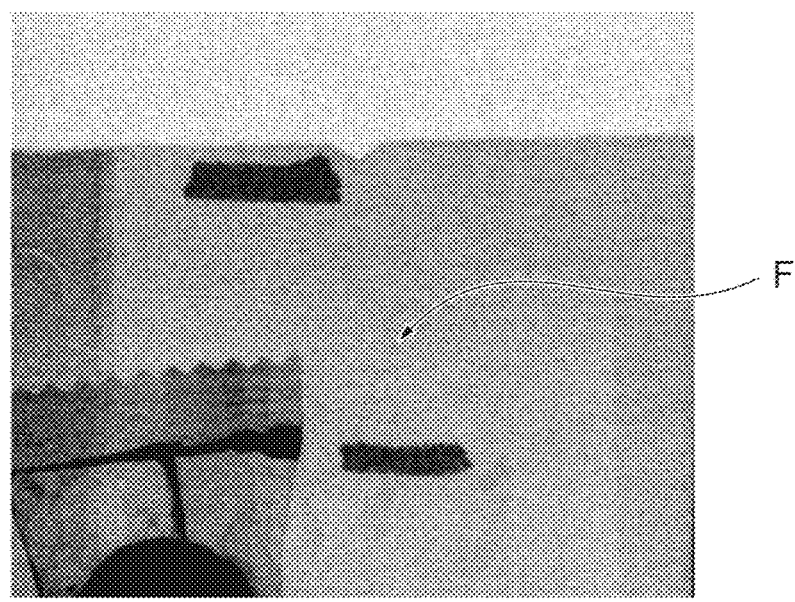
(c)
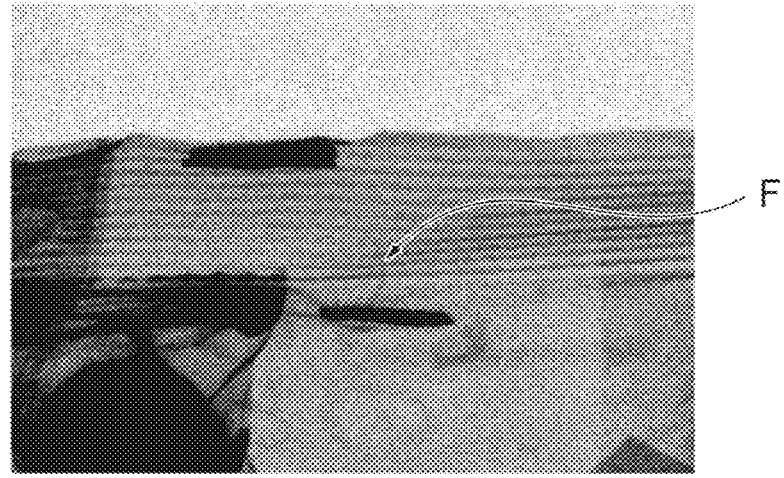

*Fig.18*
(a)
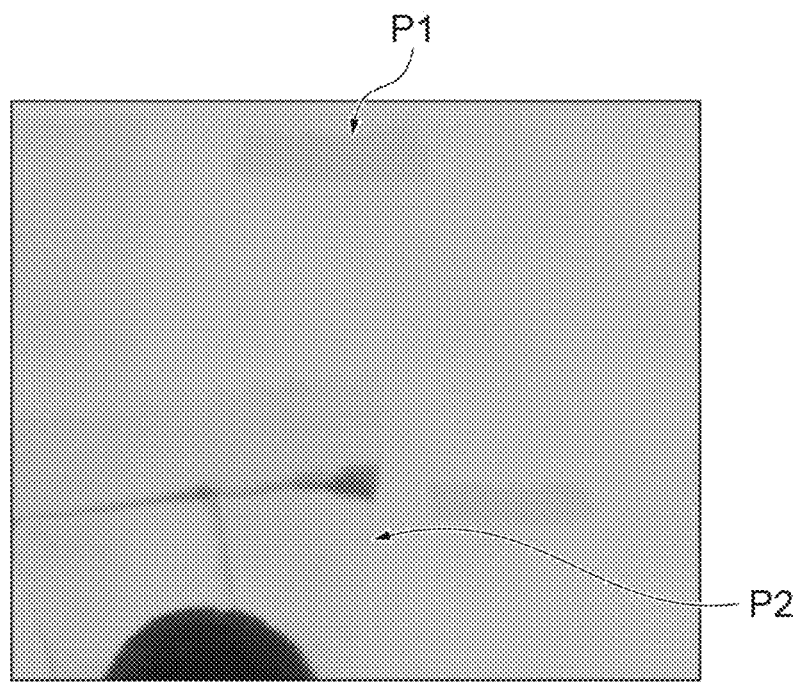
(b)
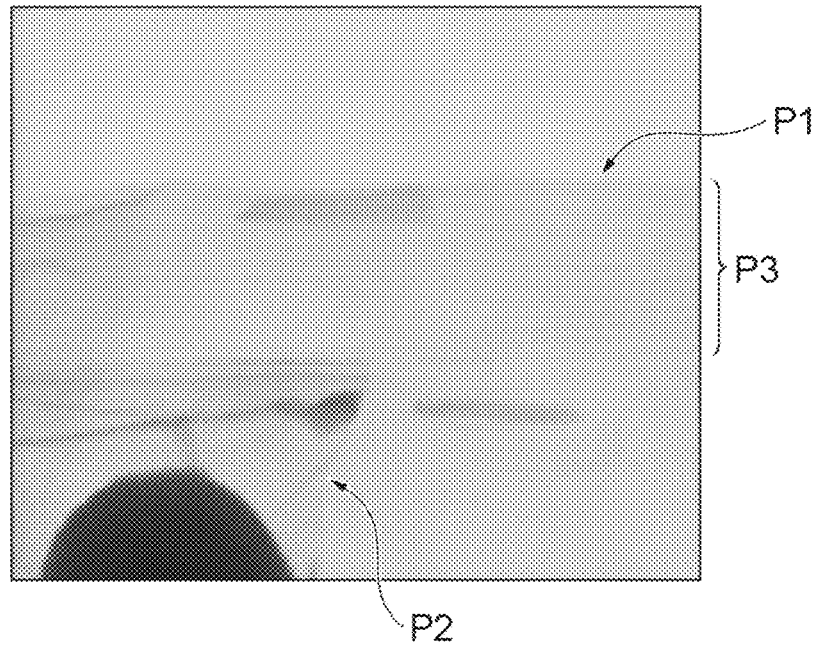

IMAGING UNIT, RADIOLOGICAL IMAGE ACQUISITION SYSTEM, AND RADIOLOGICAL IMAGE ACQUISITION METHOD

TECHNICAL FIELD

The present disclosure relates to an imaging unit, a radiological image acquisition system, and a radiological image acquisition method.

BACKGROUND ART

Conventionally, there is known a radiation detection apparatus that includes a radiation source and a radiation detector, irradiates with radiation an object conveyed on a conveying path placed between the radiation source and the radiation detector, and converts the transmitted radiation into fluorescence (visible light) using a wavelength conversion member (see Patent Literature 1). In this radiation detection apparatus, the wavelength conversion member is supported on a support portion provided in the housing. The radiation transmitted through the object passes through an opening portion formed in a shielding member and enters the wavelength conversion member. The fluorescence emitted by the fluorescent layer of the wavelength conversion member passes through a light condenser and enters the light-receiving portion of a photoelectric conversion element. The radiation detector generates and outputs a two-dimensional radiological image signal of the object.

CITATION LIST

Patent Literature

Patent Literature 1: Japanese Unexamined Patent Publication No. 2018-141673

SUMMARY OF INVENTION

Technical Problem

In the conventional detector described above, radiation passing through the opening portion tends to expand. This increases the irradiation range of radiation on the input surface (the base material layer of the wavelength conversion member in the above detector) of the wavelength conversion member, resulting in a reduction in resolution. In addition, since the working distance is long, the sensitivity is low.

The present disclosure describes an imaging unit, a radiological image acquisition system, and a radiological image acquisition method which can improve the resolution and the sensitivity.

Solution to Problem

According to one aspect of the present disclosure, there is provided an imaging unit for acquiring a radiological image of an object conveyed in a conveying direction, the imaging unit including a housing having an entrance window that allows radiation transmitted through the object to pass through, a scintillator placed in the housing and having an input surface to which the radiation passing through the entrance window is input, a line scan sensor placed in the housing and having an imaging surface that captures an image of scintillation light output from the input surface, a slit member placed between the entrance window and the scintillator and configured to form a slit that guides the radiation passing through the entrance window toward the input surface, and a 1× lens placed between the scintillator and the line scan sensor and configured to form the scintillation light output from the input surface into an image on the imaging surface of the line scan sensor.

According to this imaging unit, the radiation transmitted through the object passes through the entrance window of the housing and enters the housing. The slit member in the housing guides the radiation toward the input surface of the scintillator. At this time, the slit of the slit member narrows (that is, restricts) the irradiation region of radiation on the input surface of the scintillator. This makes it possible to improve the resolution. The 1× lens used for forming scintillation light into an image can shorten the working distance and hence can improve the sensitivity. The 1× lens is placed, for example, close to the input surface of the scintillator. In such a case as well, since the slit narrows the irradiation region of radiation, the influence of scattered radiation is reduced.

The slit member is placed so as to locate the slit in a normal direction of the input surface of the scintillator, and the 1× lens and the line scan sensor may form the scintillation light output in a direction oblique to the normal direction of the input surface into an image and capture the image. In this case, the 1× lens and the line scan sensor can be easily placed close to the input surface. This makes it possible to perform desired image capturing in terms of improving the resolution and the sensitivity.

The slit member may be placed so as to make the slit extend obliquely to the conveying direction. When the slit is directed oblique to the conveying direction, the optical path of radiation transmitted through the object can be increased. This increases the contrast of an acquired radiological image.

The slit member is placed so as to locate the slit in a direction oblique to the normal direction of the input surface of the scintillator, and the 1× lens and the line scan sensor may form the scintillation light output in the direction oblique to the normal direction of the input surface into an image and capture the image. In this case as well, the 1× lens and the line scan sensor can be easily placed close to the input surface.

The housing may have another entrance window that allows radiation transmitted through the object to pass through, the imaging unit may further include another slit member placed between the other entrance window and the scintillator and form another slit that guides the radiation passing through the other entrance window toward the input surface, and the slit member and the other slit member may be placed so as to make the slit and the other slit respectively guide the radiation from two directions different from each other with respect to the input surface of the scintillator. The radiological images based on radiation guided (entering) from the two different directions become different images based on a difference in angle. This can improve the accuracy of various types of inspections. For example, it is possible to shorten the inspection time by acquiring two types of images by one image capturing operation using a mechanical shutter, etc.

The imaging unit may further include a cover member configured to hold the slit member and be detachably attached to the housing. Preparing a cover member and a plurality of types of parts to be combined with the slit member held by the cover member and interchanging them as needed can easily change the incident direction (incident angle) of radiation with respect to the input surface of the scintillator. For example, changing the incident angle of radiation and performing image capturing a plurality of times can improve the accuracy of various types of inspections.

The slit member may be configured to make the slit decrease in width in the conveying direction toward the input surface of the scintillator. In this case, since the inlet portion of the slit can be widened, it is possible to change the incident direction (incident angle) of radiation with respect to the input surface of the scintillator or guide radiation to the input surface in a plurality of incident directions.

The slit member, the 1x lens, and the line scan sensor may be configured to be rotatable about an axis extending along the input surface in the housing. In this case, it is possible to easily change the incident direction (incident angle) of radiation with respect to the input surface of the scintillator. For example, performing image capturing a plurality of times while changing the incident direction of radiation can improve the accuracy of various types of inspections.

According to another aspect of the present disclosure, there may be provided a radiological image acquisition system that acquires a radiological image of an object, the radiological image acquisition system including a radiation source configured to output the radiation toward the object, a conveying apparatus configured to convey the object in the conveying direction and allows the radiation to pass through, and any one of the imaging units described above which is installed so as to place the radiation source and the entrance window on the same plane. According to this radiological image acquisition system, it is possible to improve the resolution and also improve the sensitivity owing to the above action.

In the radiological image acquisition system, the conveying apparatus and the slit member of the imaging unit may be placed so as to make the slit extend obliquely to the conveying direction. When the slit is directed oblique to the conveying direction, the optical path of radiation transmitted through the object can be increased. This increases the contrast of an acquired radiological image.

According to still another aspect of the present disclosure, there is provided a radiological image acquisition method of acquiring a radiological image of an object, the radiological image acquisition method including a radiation output step of outputting radiation toward the object conveyed in a conveying direction, a radiation guiding step of making the radiation transmitted through the object enter a housing through an entrance window and guiding the radiation toward an input surface of a scintillator using a slit formed in the housing, a scintillation light output step of inputting the radiation passing through an entrance window to the input surface of the scintillator, converting the input radiation into scintillation light, and outputting the scintillation light from the input surface, a scintillation light image forming step of forming the scintillation light output from the input surface into an image on an imaging surface of a line scan sensor using a 1x lens, and a scintillation light imaging step of capturing an image of the scintillation light on the imaging surface of the line scan sensor.

According to this radiological image acquisition method, radiation transmitted through the object passes through the entrance window of the housing and enters the housing. The slit member in the housing guides the radiation toward the input surface of the scintillator. At this time, the slit of the slit member narrows (that is, restricts) the irradiation region of radiation on the input surface of the scintillator. This makes it possible to improve the resolution. The 1x lens used in the scintillation light image forming step can shorten the working distance and hence can improve the sensitivity. The 1x lens is placed, for example, close to the input surface of the scintillator. In such a case as well, since the slit narrows the irradiation region of radiation in the radiation guiding step, the influence of scattered radiation is reduced.

In the radiation output step, the object is conveyed in the conveying direction a plurality of times, and radiation is output to the object from a plurality of different directions in the plurality of times of conveyance. In the radiation guiding step, in a plurality of times of conveyance, radiation may be guided to the input surface of the scintillator from a plurality of directions. The radiological image acquisition method may further include an image processing step of performing image processing for a plurality of captured images obtained in the scintillation light imaging step. Radiological images based on radiation guided (applied) from a plurality of directions become different images based on differences in angle. This makes it possible to improve the accuracy of various types of inspections.

Effects of Invention

According to some aspects of the present disclosure, it is possible to improve the resolution and also improve the sensitivity.

BRIEF DESCRIPTION OF DRAWINGS

FIGS. 5(*a*) and 5(*b*) are views showing the placements of the respective units of radiological image acquisition systems according to various modifications;

FIGS. 6(*a*) and 6(*b*) are views for explaining a difference in the incident angle of radiation with respect to an object;

FIGS. 8(*a*) and 8(*b*) are views showing the internal configurations of radiological image acquisition systems according to various modifications;

FIGS. 9(*a*) and 9(*b*) are views showing the internal configurations of radiological image acquisition systems according to various modifications;

FIGS. 10(*a*) to 10(*c*) are views showing procedures for irradiation and imaging from a plurality of directions;

FIG. 16 is a table showing the measurement results of radiation scattering experiments;

FIGS. 17(a) to 17(c) are views respectively showing the radiological images obtained by imaging experiments using samples; and FIGS. 18(a) and 18(b) are views respectively showing the radiological images obtained by imaging experiments using samples.

DESCRIPTION OF EMBODIMENTS

Figure 1:
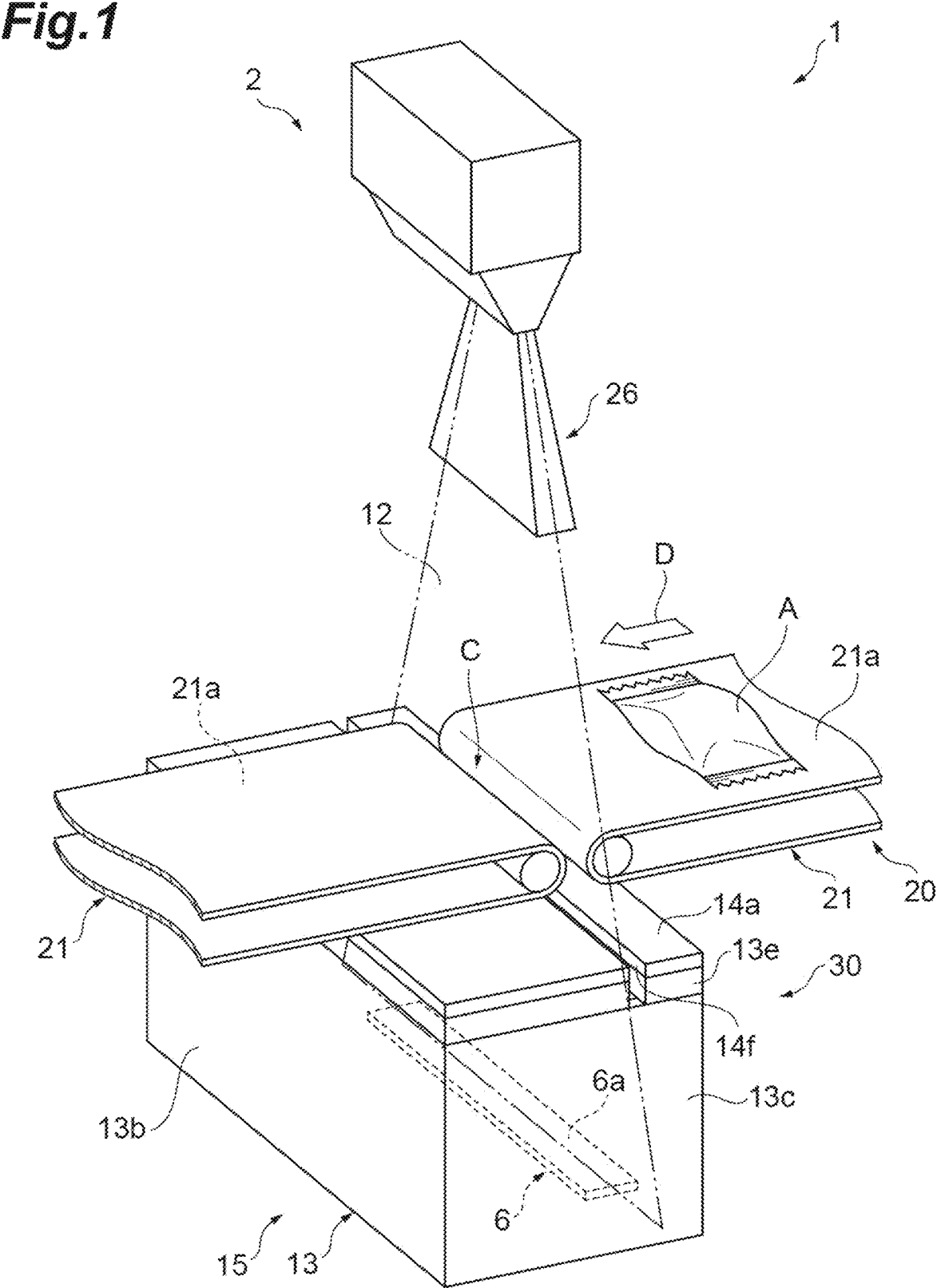
FIG. 1 is a perspective view showing a radiological image acquisition system according to one embodiment of the present disclosure.

Hereinafter, embodiments of the present disclosure will be described below with reference to the accompanying drawings. Note that the same reference signs denote the same elements in the description of the drawings, and any overlapping description will be omitted. Also, the respective drawings are prepared for the purpose of description, and are drawn so that the portions to be described are particularly emphasized. Therefore, the dimensional ratios of respective members in the drawings are not always coincident with actual ratios.

Figure 2:
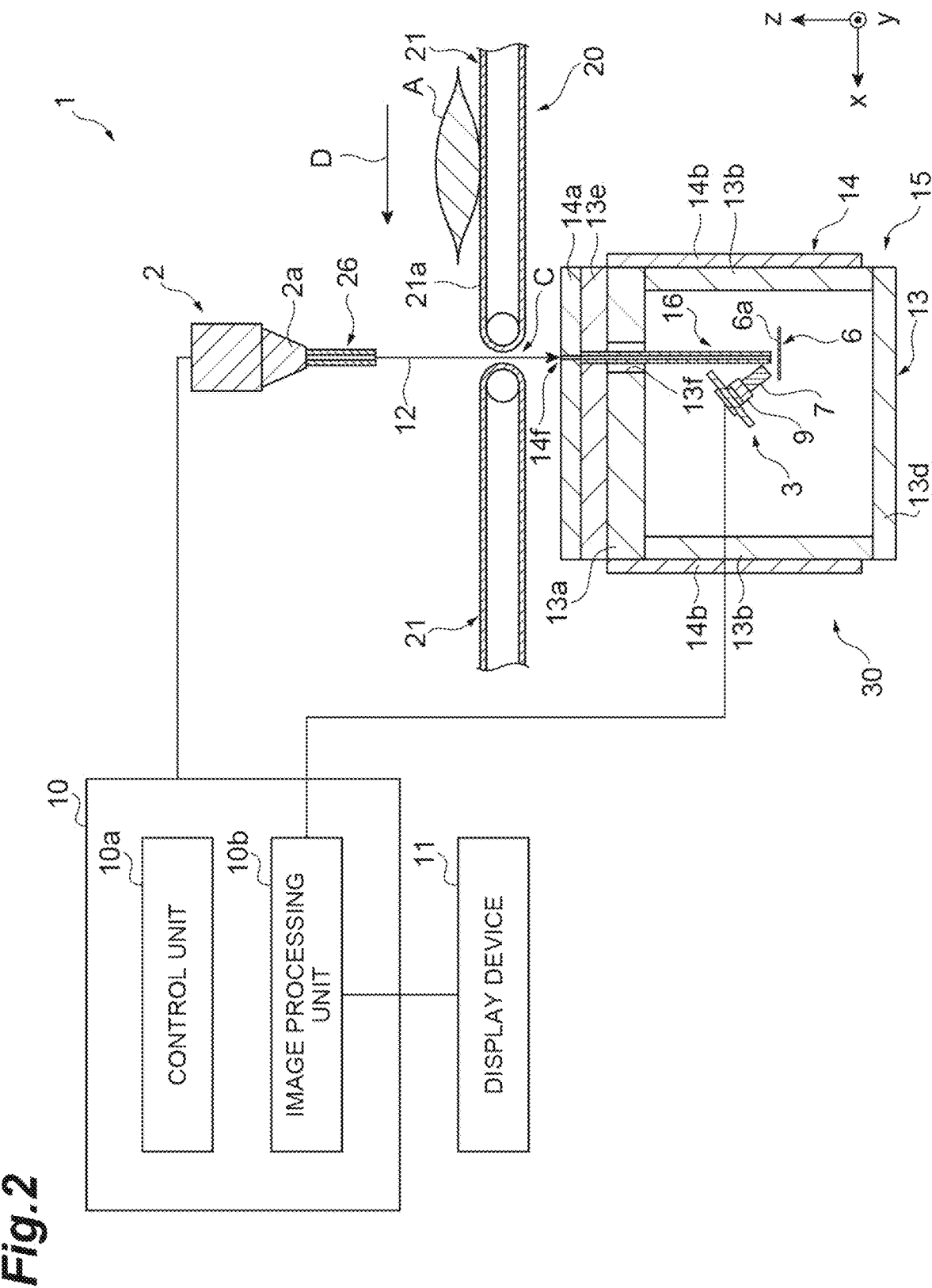
FIG. 2 is a view showing the schematic configuration of the radiological image acquisition system shown in FIG. 1.

As shown in FIGS. 1 and 2, a radiological image acquisition system 1 according to one embodiment is an apparatus for acquiring a radiological image of an object A. The radiological image acquisition system 1 is a non-destructive inspection system that can inspect the object A without disassembly, destruction, or the like. The object A contains, for example, a substance composed of a light element. The radiological image acquisition system 1 is applied to, for example, fields such as food inspection, battery inspection, and electronic component inspection. In the field of food inspection, for example, the presence or absence of foreign matter getting caught in sealed containers and packaging is inspected. The radiological image acquisition system 1 is particularly excellent in performance for distinguishing a substance composed of a light element. Such substances include, for example, food debris, hair, plastic, insects, and bones in meat. The radiological image acquisition system 1 is applied to, for example, inline X-ray inspection.

The radiological image acquisition system 1 includes a radiation source 2 that outputs radiation such as white X-rays toward the object A, a conveying apparatus 20 that conveys the object A in a predetermined conveying direction D, a scintillator 6 that generates scintillation light in accordance with the input of radiation transmitted through the object A conveyed by the conveying apparatus 20, a line scan sensor 3 that detects scintillation light output from a radiation input surface 6a of the scintillator 6, and a computer 10 that controls several functions of the radiological image acquisition system 1 and generates a radiological image. As described above, the radiological image acquisition system 1 is an X-ray photographing system based on a scintillator obverse surface observation scheme. The radiological image acquisition system 1 is excellent in low-energy X-ray sensitivity.

The radiation source 2 outputs cone beam X-rays from an X-ray emission portion. The radiation source 2 has a focus 2a of cone beam X-rays. The radiation source 2 may be, for example, a microfocus X-ray source or millifocus X-ray source. The X-rays emitted from the radiation source 2 form a radiation flux. The radiological image acquisition system 1 is provided with a radiation source side slit member 26 and a slit member 16 (see FIG. 2) to input X-rays in an irradiation region 12, which is a narrowed part of X-rays in the output region in which a radiation flux is present, to the input surface 6a of the scintillator 6. The irradiation region 12 extends in a triangular shape (or fan shape) toward the scintillator 6 in a housing 15 of an imaging unit 30.

The conveying apparatus 20 includes, for example, two belt conveyors 21, 21 that move along, for example, an orbital path. The object A is placed or held on a conveying surface 21a of the belt conveyor 21. The belt conveyor 21 is a conveying stage or conveying unit. The conveying apparatus 20 includes a drive source (not shown) that drives each belt conveyor 21. The conveying apparatus 20 is configured to convey the object A in the conveying direction D at a constant speed. In this embodiment, the conveying direction D is the horizontal direction. A gap C that allows X-rays to pass through is provided at a position corresponding to the irradiation region 12 described above between the two belt conveyors 21, 21. The gap C has a small constant length (width) in the conveying direction D and linearly extends in the horizontal detection width direction orthogonal to the conveying direction D. A conveying timing and a conveying speed are set in advance for the object A in the conveying apparatus 20 and are controlled by a control unit 10a of the computer 10. Note that the belt conveyors 21 need not have the gap C that allows X-rays to pass through, and the belt member of each belt conveyor 21 may be formed from a radiotransparent material.

Note that the radiological image acquisition system 1 is compatible with conveying apparatuses 20 of all types. For example, the conveying direction D may be horizontal or tilted with respect to the horizontal direction. The conveying direction D may not be linear and may be, for example, curved. In this case, the conveying direction D may be a tangent to a portion of the conveying path for the object A which overlaps the irradiation region 12. The conveying apparatus 20 may not have the physical conveying surface 21a. For example, the conveying apparatus 20 may convey the object A while levitating it by air. Alternatively, the conveying apparatus 20 may convey the object A by ejecting the object A into air. In this case, the conveying path for the object A may be, for example, parabolic in shape.

The conveying apparatus 20 is not limited to the form having the belt conveyors 21. For example, the conveying apparatus 20 may have a roller conveyor including a plurality of rollers. The roller conveyor has no belt, and hence can be free from the influence of the belt. A roller conveyor is also advantageous over a belt conveyor in that gaps (slit-shaped openings) are formed between the rollers. Using the roller conveyor will reduce X-ray attenuation caused by the belt. In consideration of the placement of the radiation source 2 and the placement of the irradiation region 12 (oblique irradiation) (to be described later), the roller conveyor can be used effectively. The roller conveyor is a conveying means suitable for the radiological image acquisition system 1 having importance on low-energy X-ray sensitivity. As in this embodiment, two or more belt conveyors may be installed in the conveying direction, and X-rays may be applied from the gap C between the belt conveyors. This form can eliminate the influence of the belts while using the belt conveyors 21.

Figure 3:
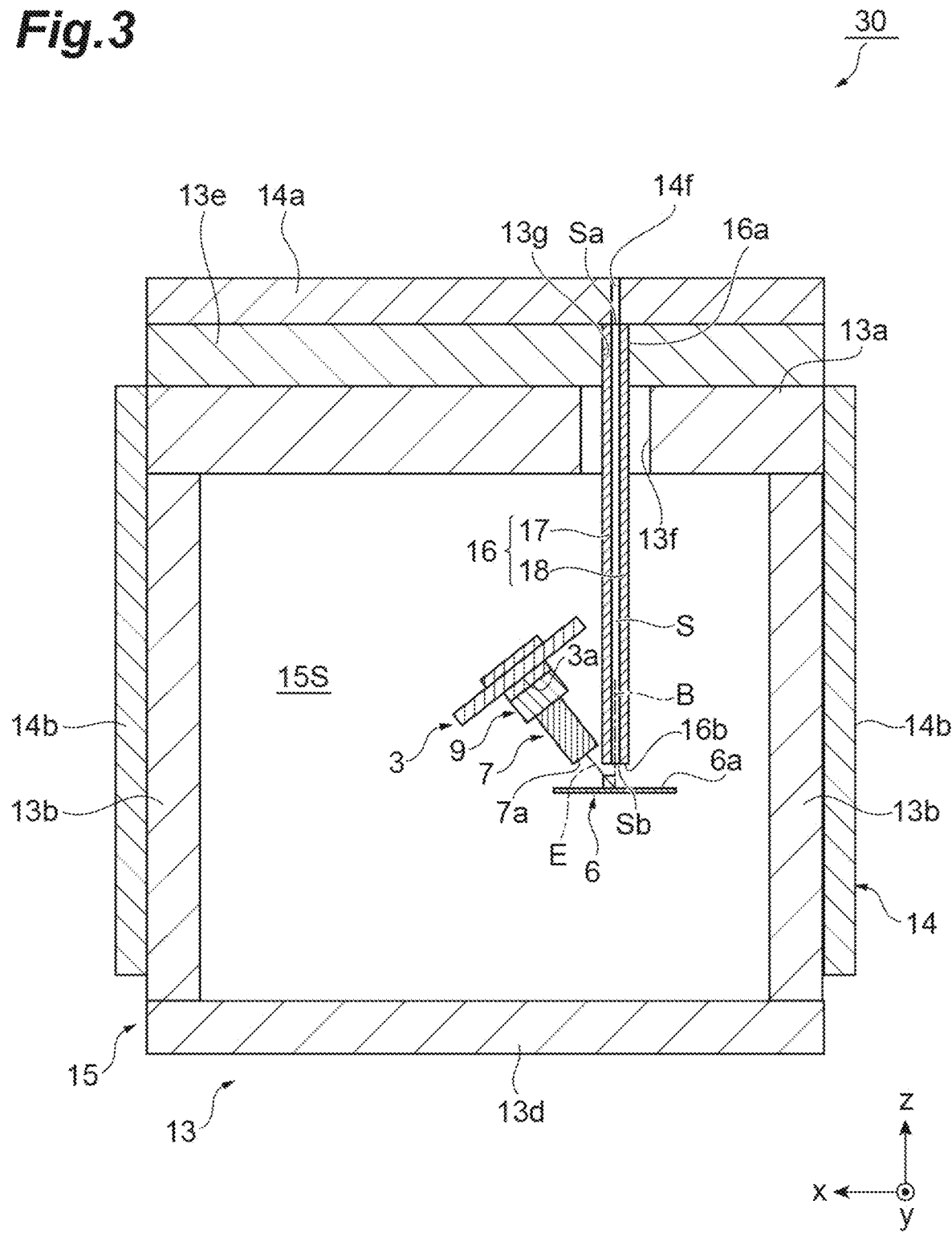
FIG. 3 is a sectional view showing the internal configuration of an imaging unit in FIG. 1.

As shown in FIGS. 1 to 3, the radiological image acquisition system 1 includes the imaging unit 30 installed along the conveying apparatus 20. The imaging unit 30 is attached to, for example, the conveying apparatus 20 and fixed to the conveying apparatus 20. The imaging unit 30 may be attached to anything other than the conveying apparatus 20. The imaging unit 30 may be mounted on the base or the like. The imaging unit 30 is attached so as not to interfere with the circular motion of the belt conveyors 21. The same applies to a case in which the conveying apparatus 20 is a roller conveyor. The imaging unit 30 is placed with some gap from the conveying unit such as a belt conveyor or roller conveyor so as not to interfere with the movement of the conveying unit.

The imaging unit 30 includes the housing 15 having a rectangular parallelepiped shape. The housing 15 includes, for example, a housing body 13 having a rectangular parallelepiped shape and formed from, for example, aluminum and a lead cover 14 covering the outer surface (outer periphery) of the housing body 13. The housing body 13 accommodates the respective components of the imaging unit 30 in an internal space 15S. The lead cover 14 shields against radiation to prevent radiation outside the housing body 13 from affecting the internal space 15S of the imaging unit 30. The lead cover 14 may be placed outside or inside the housing 15. Another cover may be attached to the outside of the lead cover 14. From the viewpoint of the strength and handling of lead, another material is preferably attached to the outside of the lead. A substance other than lead may be used as a material for the cover. For example, tungsten, iron, stainless steel, or copper may be used. Alternatively, a rubbery material or sheet-like material obtained by containing a heavy metal such as tungsten in rubber (resin) may be used.

The housing body 13 is formed from a material that can shield against X-rays. The housing body 13 may be formed from iron, stainless steel, or the like. The housing body 13 may contain a protective material. As the protective material, lead, tungsten, or copper may be used. Alternatively, a rubbery material or sheet-like material obtained by containing a heavy metal such as tungsten in rubber (resin) may be used. The housing body 13 includes an upper wall portion 13a and a bottom wall portion 13d which face each other in the up-down direction, a pair of first side wall portions 13b which face each other in the conveying direction D, and a pair of second side wall portions 13c which face each other in the horizontal detection width direction orthogonal to the conveying direction D. The imaging unit 30 is a compact apparatus whose size is very small in the conveying direction D of the housing body 13. The conveying direction D is parallel to the x direction parallel to the drawing surface shown in FIG. 1. The above detection width direction is parallel to the y direction perpendicular to the drawing surface shown in FIG. 1. The up-down direction is parallel to the z direction parallel to the drawing surface shown in FIG. 1.

The upper wall portion 13a is placed to face the conveying apparatus 20. A top plate portion 14a of the lead cover 14 is attached on the upper wall portion 13a with a gap from the upper wall portion 13a. The top plate portion 14a is placed parallel to the upper wall portion 13a. A support plate portion 13e formed from aluminum for supporting the slit member 16 (to be described later) is provided between the upper wall portion 13a and the top plate portion 14a. Note that the support plate portion 13e for supporting the slit member 16 may be formed from a metal such as stainless steel or iron. A pair of first side plate portions 14b of the lead cover 14 are attached to lateral surfaces of the pair of the first side wall portions 13b. A pair of second side plate portions (not shown) of the lead cover 14 are attached to the lateral surfaces of the pair of second side wall portions 13c. The lead cover 14 covers the entire surface of the housing body 13 except for the bottom wall portion 13d. Note that FIG. 1 omits the illustration of the first side plate portions 14b.

An entrance window 14f that allows X-rays transmitted through the object A to pass through is formed in the top plate portion 14a of the lead cover 14. The entrance window 14f has a small constant length (width) in the x direction and linearly extends in the y direction. The length of the entrance window 14f in the x direction may be determined by the width of a slit S of the slit member 16 (to be described later) or the desired width (the thickness in the conveying direction D) of the irradiation region 12. The length of the entrance window 14f in the x direction is constant in the detection width direction (y direction) and the thickness direction (z direction) of the top plate portion 14a.

A through hole 13g (see FIG. 3) having a constant length (width) in the x direction and linearly extending in the y direction is formed in the support plate portion 13e at a position corresponding to the entrance window 14f. The slit member 16 for defining the irradiation region 12 is placed and fixed in the through hole 13g. The slit member 16 includes a first slit plate 17 and a second slit plate 18 which face each other with a small constant gap in the x direction. The first slit plate 17 and the second slit plate 18 are formed from, for example, copper. The gap between the first slit plate 17 and the second slit plate 18 is the width of the slit S formed by the slit member 16 and is equal to, for example, the above-described length (width) of the entrance window 14f in the x direction. The width of the slit S may be slightly different from the length (width) of the entrance window 14f in the x direction. In a state that an upper end portion 16a of the slit member 16 is inserted into the through hole 13g of the support plate portion 13e, the upper end portion 16a is fixed to the support plate portion 13e. The support plate portion 13e supports the slit member 16 such that the slit S is continuous with the entrance window 14f. That is, an inlet end Sa of the slit S directly (for example, without any gap) communicates with the entrance window 14f. The both end portions of each of the first slit plate 17 and the second slit plate 18 may be opened or closed with another copper plate or the like.

The slit member 16 is installed in the housing 15. The slit member 16 is installed between the entrance window 14f and the scintillator 6. The slit member 16 extends through an opening 13f formed in the upper wall portion 13a and extends downward to the internal space 15S. The slit member 16 extends near to the input surface 6a of the scintillator 6. The placement of the slit member 16 and the positional relationship between the slit member 16 and the scintillator 6 will be described later. Note that if, for example, the top plate portion 14a is not provided, the upper end portion of the slit member 16 may be exposed on the top surface of the housing 15 or may protrude upward from the housing 15. In this case, the upper end portion of the member of the slit member 16 also serves as an entrance window.

As shown in FIGS. 1 and 2, the radiation source 2 is provided with the radiation source side slit member 26 that defines the irradiation region 12. The radiation source side slit member 26 has, for example, a pair of triangular copper plates. The pair of triangular copper plates face each other with a constant gap in the x direction and form a slit. The both end portions of the radiation source side slit member 26 in the y direction are closed with, for example, another copper plate. The respective members are installed in the radiological image acquisition system 1 such that the focus 2a of the radiation source 2, the slit of the radiation source side slit member 26, the gap C of the conveying apparatus 20, the entrance window 14f, and the slit S of the slit member 16 are arranged on the same plane. These members define (restrict) the irradiation region 12 of X-rays. Only part of the X-rays output from the radiation source 2 is transmitted through the object A and reaches the input surface 6a of the scintillator 6. The irradiation region 12 is a quadrangular pyramid region having a slight thickness in the x direction which is defined by the inner peripheral surface of the radiation source side slit member 26, the inner wall surface of the entrance window 14f, and the inner wall surface of the slit member 16.

As shown in FIGS. 2 and 3, the slit S of the slit member 16 guides the X-rays passing through the entrance window 14f toward the input surface 6a of the scintillator 6. The slit member 16 prevents X-rays from being scattered in the internal space 15S of the housing 15. The X-rays inside the irradiation region 12 which have passed through the slit member 16 are input to the input surface 6a of the scintillator 6. Note that "the input surface 6a of the scintillator 6" means only a region effective in outputting scintillation light. For example, of the entire rectangular input surface 6a, a region covered with the scintillator holder is not included in "the input surface 6a of the scintillator 6."

In the radiological image acquisition system 1, the imaging unit 30 is configured to capture an image of scintillation light output from the input surface 6a of the scintillator 6 in a direction oblique to the input surface 6a. The scintillator 6, the line scan sensor 3, and a 1× lens 7 are installed in the housing 15. In addition, a shielding member 9 is attached between the line scan sensor 3 and the 1× lens 7. The line scan sensor 3, the shielding member 9, and the 1× lens 7 are integrated. The line scan sensor 3, the shielding member 9, and the 1× lens 7 are held by a bracket and the like (not shown) in the internal space 15S.

The scintillator 6 is held by, for example, a scintillator holder (not shown) and placed, for example, horizontally. The scintillator 6 is a flat wavelength conversion member. The scintillator 6 has a rectangular shape longer in the detection width direction (y direction) (see FIG. 1). The scintillator 6 is made of, for example, $Gd_2O_2S:Tb$, $Gd_2O_2S:Pr$, $CsI:Tl$, $CdWO_4$, $CaWO_4$, $Gd_2SiO_5:Ce$, $Lu_{0.4}Gd_{1.6}SiO_5$, $Bi_4Ge_3O_{12}$, $Lu_2SiO_5:Ce$, $Y_2SiO_5$, $YAlO_3:Ce$, $Y_2O_2S:Tb$, $YTaO_4:Tm$, YAG:Ce, YAG:Pr, YGAG:Ce, YGAG:Pr, GAGG:Ce, or the like. The thickness of the scintillator 6 is set to a proper value depending on the energy band of radiation detected in the range of several μm to several mm. The scintillator 6 converts the X-rays transmitted through the object A into visible light. X-rays with relatively low energy are converted by the input surface 6a of the scintillator 6 and output from the input surface 6a.

The line scan sensor 3 performs image capturing in accordance with the movement of the object A and outputs radiological image data as one-dimensional image data. The line scan sensor 3 has an imaging surface 3a that captures an image of scintillation light output from the input surface 6a of the scintillator 6. The line scan sensor 3 is, for example, a general line sensor, a multiline sensor, or an area image sensor that can be TDI (time delay integration)-driven. The line scan sensor 3 is, for example, a CCD image sensor or a CMOS image sensor. The image sensor 3 has a configuration in which one or a plurality of element rows each having a plurality of light-receiving elements arranged in series in the pixel direction are arranged in the column direction in accordance with the moving direction of the object A. The line scan sensor 3 has a scan direction corresponding to the conveying direction D of the object A and a line direction orthogonal to the scan direction. This line direction is the above pixel direction, which is parallel to the y direction in FIG. 2. The scan direction corresponds to the column direction described above, which is parallel to the z direction in FIG. 2. In the case of the area image sensor that can be TDI-driven, the column direction is the same direction as the integration direction.

The control unit 10a controls the line scan sensor 3 so as to capture an image of the object A in accordance with the movement of the object A. That is, the line scan sensor 3 captures an image on the imaging surface 3a in synchronism with the movement of the object A by the conveying apparatus 20 and outputs radiological image data. This makes it possible to obtain a radiological image with a high S/N ratio. In order to synchronize the movement of the object A by the stage with image capturing by the line scan sensor, the stage may be provided with an encoder to control the line scan sensor 3 in accordance with a signal from the encoder.

The scintillator 6 according to this embodiment is placed such that the input surface 6a is parallel to both the conveying direction D and the above line direction. That is, the input surface 6a of the scintillator 6 is parallel to an x-y plane.

The 1× lens 7 is placed between the scintillator 6 and the line scan sensor 3 and forms the scintillation light output from the input surface 6a into an image on the imaging surface 3a of the line scan sensor 3. The 1× lens 7 is a lens having a magnification of 1 and can be implemented by, for example, a refractive index distribution lens (GRIN lens), rod lens, or rod lens array. The 1× lens 7 is focused on the input surface 6a of the scintillator 6. Since the 1× lens 7 has a large depth of field, even if a phosphor is obliquely imaged, the defocusing is small. That is, this lens is advantageous for oblique image capturing as in this embodiment. In addition, the 1× lens 7 increases the degree of freedom in combining the placements of the radiation source 2, the object A, and the line scan sensor 3.

The shielding member 9 is a radiation shielding member that transmits the scintillation light generated by the scintillator 6 and condensed by the 1× lens 7 and shields against X-rays. The shielding member 9 is lead-containing glass, lead-free radiation shielding glass containing a heavy element such as Sr, Ba, Ti, B, W, Si, Gd, or Zr, an FOP (fiber optic plate), a radiation shielding resin, or the like. The shielding member 9 is attached to the surface of the line scan sensor 3 (the surface of a protective resin). The shielding member 9 reduces the influence of scattered X-rays.

As shown in FIG. 3, in the imaging unit 30 of the radiological image acquisition system 1, the slit member 16 is placed such that the slit S is located in the normal B direction of the input surface 6a of the scintillator 6. The 1× lens 7, the shielding member 9, and the line scan sensor 3 are arranged in a direction oblique to the normal B direction of the input surface 6a. The 1× lens 7 forms scintillation light output in the direction oblique to the normal B direction of the input surface 6a into an image on the imaging surface 3a. The line scan sensor 3 captures an image of the scintillation light output in the direction oblique to the normal B direction of the input surface 6a.

An outlet end Sb of the slit S which is formed by the slit member 16 is close to the input surface 6a of the scintillator 6. A distal end face 7a of the 1× lens 7 is close to the input surface 6a of the scintillator 6. In the imaging unit 30, the respective members are arranged such that the slit member 16 and the 1× lens 7 are as close as possible to the input surface 6a of the scintillator 6. The slit member 16 extends to a position close to the input surface 6a of the scintillator 6 to the extent that no problem occurs in image capturing of scintillation light by the line scan sensor 3 and the 1× lens 7. The distance from the outlet end Sb of the slit S to the input surface 6a of the scintillator 6 is preferably, for example, less than 20 mm. The distance from the outlet end Sb of the slit S to the input surface 6a of the scintillator 6 is preferably as short as possible and is more preferably less than 5 mm. Note that the lower ends of the two slit plates need not be aligned with each other, and the 1× lens 7 side slit plate (first slit plate) and the opposite side plate (second slit plate) may differ in distance to the scintillator.

Figure 15:
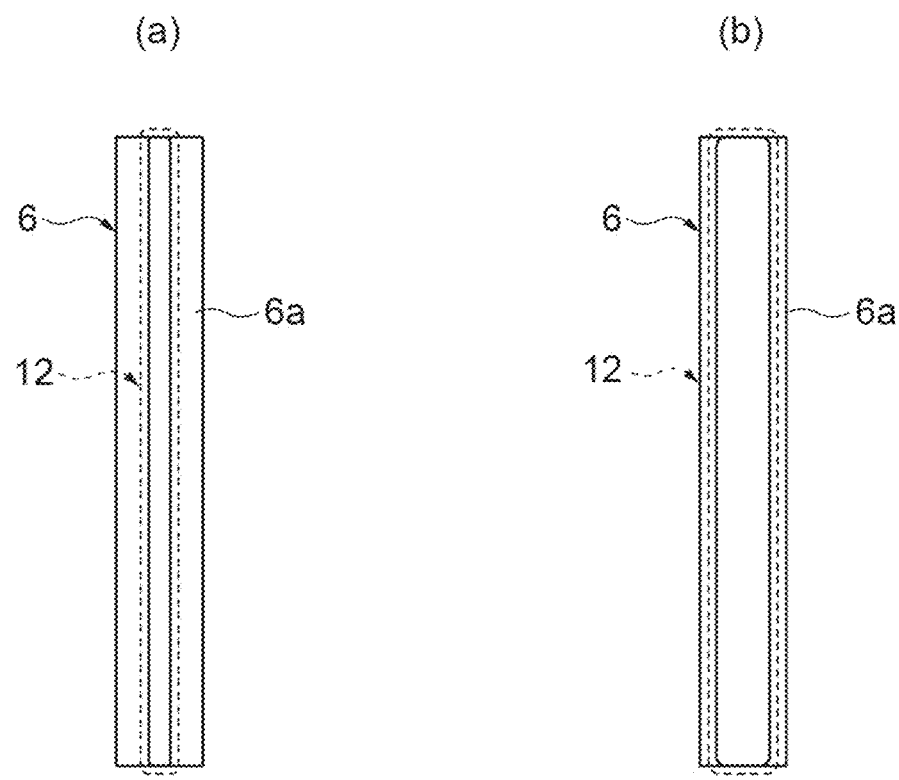
FIGS. 15(*a*) and 15(*b*) are views showing differences in irradiation region and image formation region between a structure with a slit member and a structure without a slit member.

The 1× lens 7 is placed such that the distal end face 7a thereof approaches the irradiation region 12 (see FIG. 15(a)) on the scintillator 6 to such an extent that the distal end face 7a does not interfere with the scintillator 6 and the slit member 16.

The computer 10 includes, for example, a CPU (Central Processing Unit), ROM (Read Only Memory), RAM (Random Access Memory), and input/output interface. The computer 10 includes the control unit 10a (control processor) that controls the radiation source 2 and the line scan sensor 3 and an image processing unit 10b (image processor) that forms a radiological image of the object A based on the radiological image data output from the line scan sensor 3. The image processing unit 10b inputs radiological image data and executes predetermined processing such as image processing for the input radiological image data. A display device 11 is connected to the computer 10. The image processing unit 10b outputs the generated radiological image to the display device 11. The control unit 10a controls the radiation source 2 based on the values of tube voltage and tube current for the radiation source 2 which are, for example, input by the user and stored. The control unit 10a controls the line scan sensor 3 based on the exposure time, etc., for the line scan sensor 3 which are, for example, input by the user and stored. The control unit 10a and the image processing unit 10b may be different processors or the same processor. In addition, the computer 10 may be programmed to execute the functions of the control unit 10a and the image processing unit 10b. Note that the computer 10 may be constituted by a microcomputer and an FPGA (Field-Programmable Gate Array).

Next, the operation of the radiological image acquisition system 1, that is, a method of acquiring a radiological image will be described. First, the object A is conveyed in the conveying direction D by using the conveying apparatus 20 (conveying step). Concurrently, the radiation source 2 outputs radiation such as white X-rays to the object A (radiation output step). Next, the radiation transmitted through the object A is made to enter the housing 15 through the entrance window 14f, and the slit S formed in the housing 15 guides the radiation toward the input surface 6a of the scintillator 6 (radiation guiding step). The radiation transmitted through the object A is input to the input surface 6a. The scintillator 6 converts the radiation into scintillation light and outputs the scintillation light from the input surface 6a (scintillation light output step). The scintillation light output from the input surface 6a is formed into an image on the imaging surface 3a of the line scan sensor 3 by the 1× lens 7 (scintillation light image forming step). In addition, an image of the scintillation light is captured on the imaging surface 3a of the line scan sensor 3 (scintillation light imaging step). The line scan sensor 3 outputs the radiological image data obtained by imaging to the image processing unit 10b of the computer 10.

The image processing unit 10b of the computer 10 inputs radiological image data and executes predetermined processing such as image processing for the input radiological image data to form a radiological image (image forming step). The image processing unit 10b outputs the formed radiological image to the display device 11. The display device 11 displays the radiological image output from the image processing unit 10b. A radiological image based on surface observation on the object A is obtained through the above steps.

According to the imaging unit 30, the radiological image acquisition system 1, and the radiological image acquisition method according to this embodiment, the radiation transmitted through the object A enters the housing 15 through the entrance window 14f of the housing 15. The slit member 16 in the housing 15 guides the radiation toward the input surface 6a of the scintillator 6. At this time, the slit S of the slit member 16 narrows (that is, restricts) the irradiation region 12 of radiation on the input surface 6a of the scintillator 6. FIG. 15(a) shows the irradiation region 12 when the slit member 16 is provided. FIG. 15(b) shows the irradiation region 12 when the slit member 16 is not provided. As is apparent from FIGS. 15(a) and 15(b), providing the slit member 16 will restrict the irradiation region 12 on the input surface 6a of the scintillator 6 to a narrower region. Accordingly, the image forming region formed by the 1× lens 7 also becomes a narrow region as with the case of the irradiation region 12 shown in FIG. 15(a). When the irradiation region 12 of radiation on the input surface 6a of the scintillator 6 is wide, emitted fluorescence on the scintillator 6 causes crosstalk (mixing), and hence the resolution decreases. In addition, a reduction in resolution is caused by the influence of scattered rays, etc. When the irradiation region 12 of radiation is narrowed, it is possible to prevent a reduction in resolution due to crosstalk and scattered rays. Accordingly, narrowing the irradiation region 12 in this manner can improve the resolution. The 1× lens 7 used in the scintillation light image forming step can shorten the working distance and hence can improve the sensitivity. The 1× lens 7 is placed close to the input surface 6a of the scintillator 6. In such a case as well, since the irradiation region 12 of radiation is narrowed by the slit S in the radiation guiding step, the influence of scattered radiation is reduced. The slit member 16 also has the effect of preventing exposure to radiation at the line scan sensor 3 or the 1× lens 7. The imaging unit 30 is made compact by installing the slit member 16 and using the 1× lens 7.

Figure 4:
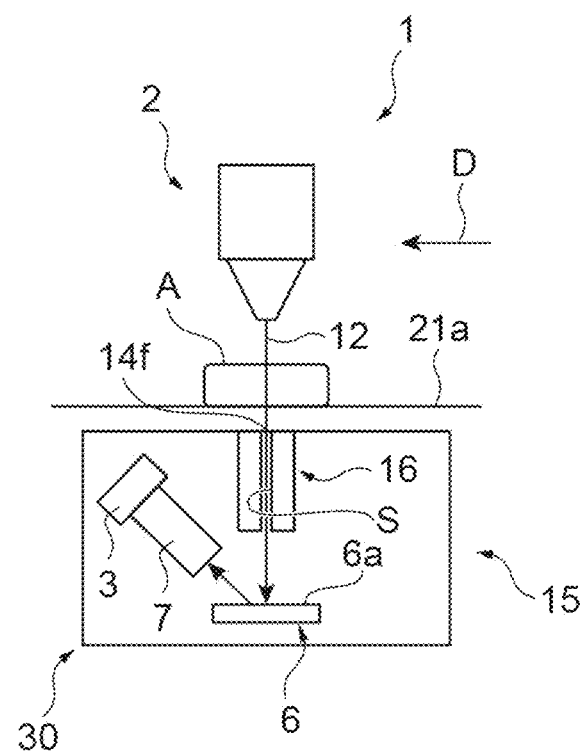
FIG. 4 is a view showing the placement of the respective units of the radiological image acquisition system in FIG. 1.

As shown in FIG. 4, the slit member 16 is placed such that the slit S is located in the normal B direction of the input surface 6a of the scintillator 6. The 1× lens 7 and the line scan sensor 3 form the scintillation light output in a direction oblique to the normal B direction of the input surface 6a into an image and capture the image. This configuration allows the 1× lens 7 and the line scan sensor 3 to be easily placed close to the input surface 6a. This makes it possible to perform desired image capturing from the viewpoint of improvements in resolution and sensitivity.

In addition, attaching the shielding member 9 to the line scan sensor 3 provides the effect of suppressing scattered X-rays. FIG. 16 is a table showing the measurement results of radiation scattering experiments. In these experiments, the lead cover 14 is placed around the housing body 13, including the vicinity of the entrance window 14f. The numbers of pixels of scattered X-rays were measured in Examples 1 and 2 each provided with a copper plate slit portion having a configuration similar to that of the slit member 16 and Comparative Example without any copper plate slit portion. As shown in FIG. 16, the ratios of scattered X-rays in Examples 1 and 2 were suppressed more than in Comparative Example. That is, the X-ray scattering reduction effect obtained by the copper plate slit portion was confirmed. In addition, a difference in the ratio of scattered X-rays was confirmed between Example 1 with the shielding member 9 and Example 2 without the shielding member 9.

That is, it was confirmed that the ratio of scattered X-rays can be suppressed to a lower level by providing the shielding member 9.

The radiological image acquisition system and the imaging unit according to the present disclosure can take various modifications other than the embodiment shown in FIGS. 2 to 4. The modifications of the present disclosure will be described below with reference to the accompanying drawings. Note that, in the following description, the illustration of the shielding member 9 is omitted. However, in each modification, the shielding member 9 may be provided as with the case of the imaging unit 30.

For example, as shown in FIG. 5(a), the slit member 16 may be placed such that the slit S extends obliquely to the conveying direction D. In a radiological image acquisition system 1A and an imaging unit 30A according to this modification, the slit member 16 is placed such that the slit S is placed in the direction oblique to the normal B of the input surface 6a of the scintillator 6. The 1× lens 7 and the line scan sensor 3 form the scintillation light output in the normal B direction of the input surface 6a into an image. As shown in FIGS. 6(a) and 6(b), directing the slit S obliquely to the conveying direction D can elongate the optical path of radiation transmitted through the object A. Assuming that the object A has a predetermined thickness (the thickness in the direction orthogonal to the conveying surface 21a), an optical path length Lb shown in FIG. 6(b) is larger than an optical path length La shown in FIG. 6(a). This increases the contrast of an obtained radiological image.

As shown in FIG. 5(b), the slit member 16 may be placed such that the slit S extends obliquely to the conveying direction D. In a radiological image acquisition system 1B and an imaging unit 30B according to this modification, the slit member 16 is placed such that the slit S is located in a direction oblique to the normal B of the input surface 6a of the scintillator 6. The 1× lens 7 and the line scan sensor 3 form the scintillation light output in the direction oblique to the normal B of the input surface 6a into an image and capture the image. In this case as well, the contrast of an obtained radiological image becomes high.

FIGS. 17(a) to 17(c) respectively show the experimental results obtained by inspecting the presence or absence of foreign matter F (hair or the like) getting caught in the sealed portions of plastic bags in which sweets are packaged. As indicated by the image of FIG. 17(a), when the slit member 16 was not provided, the foreign matter F was not visually recognized. As indicated by the image of FIG. 17(b), when the slit member 16 was provided and X-rays were made to be incident vertically as shown in FIG. 4, the foreign matter F was recognized. In addition, as indicated by the image of FIG. 17(c), when the slit member 16 was provided and X-rays were made to be incident obliquely as shown in FIG. 5, the foreign matter F was also recognized. The contrast of each of the images of FIGS. 17(b) and 17(c) became high when the tube voltage of the radiation source 2 was decreased to 25 kV and the tube current was increased to 25 mA (the tube voltage and the tube current in FIG. 17(a) were respectively 100 kV and 15 mA).

FIGS. 18(a) and 18(b) respectively show the experimental results obtained by inspecting the presence or absence of foreign matter F (hair or the like) getting caught in the sealed portions of plastic bags in which sweets are packaged. As indicated by the image of FIG. 18(a), when the slit member 16 was provided and X-rays were made to be incident vertically as shown in FIG. 4, a large packing bag P1 and a small packing bag P2 (the candy inside is depicted in black) accommodated in the large packing bag P1 were recognized.

As indicated by the image of FIG. 18(b), when the slit member 16 was provided and X-rays were made to be incident obliquely as shown in FIG. 5, the large packing bag P1, the small packing bag P2 accommodated in the large packing bag P1, and the uneven surface of a sealed portion P3 of the large packing bag P1 were recognized.

Figure 7:
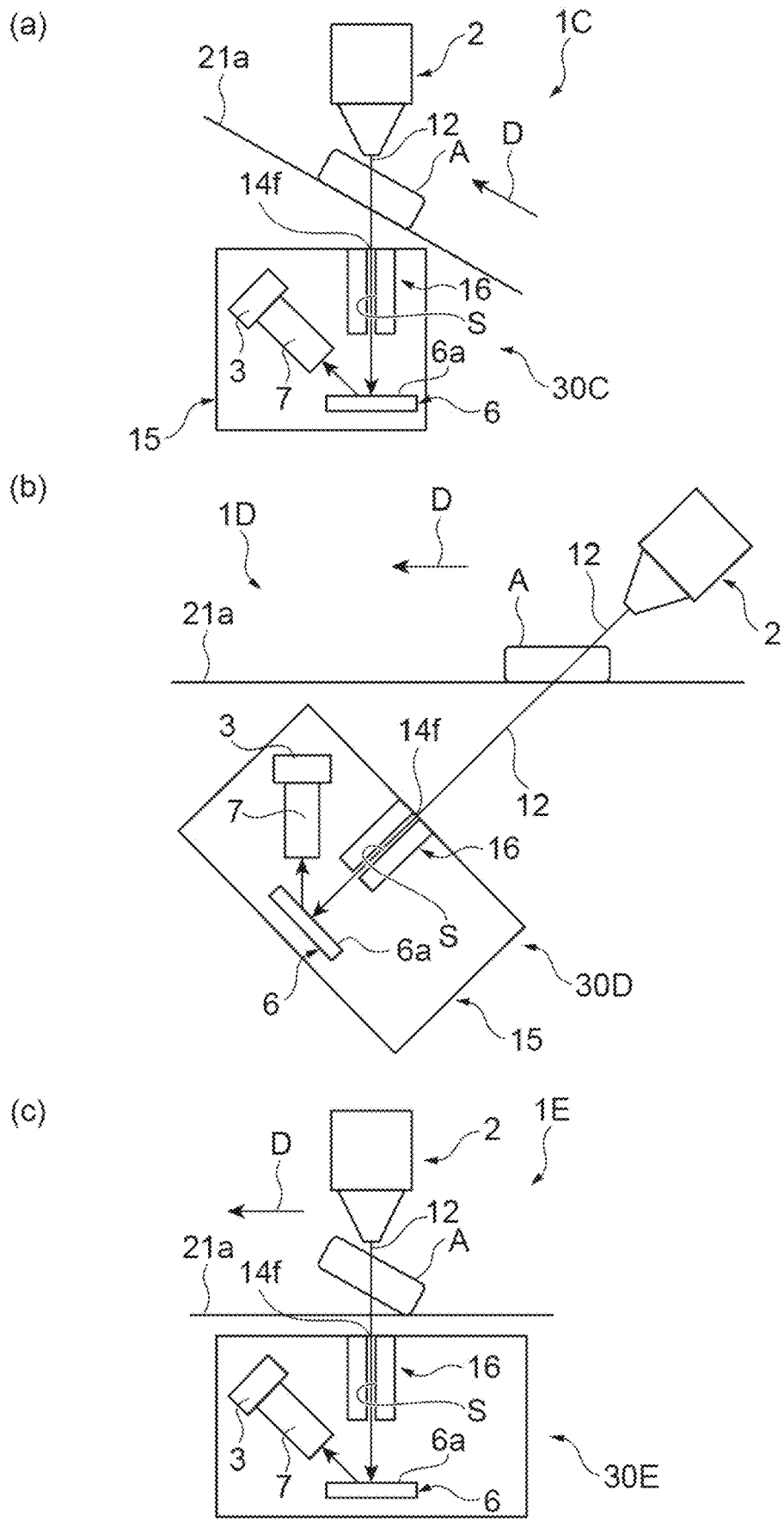
FIGS. 7(*a*) to 7(*c*) are views showing the placements of the respective units of radiological image acquisition systems according to various modifications.

As shown in FIG. 7(a), the slit member 16 may be placed such that the slit S extends obliquely to the conveying direction D. In a radiological image acquisition system 1C and an imaging unit 30C according to this modification, the conveying direction D is oblique to the input surface 6a of the scintillator 6. The slit member 16 is placed such that the slit S is located in the normal B direction of the input surface 6a of the scintillator 6. The 1× lens 7 and the line scan sensor 3 form the scintillation light output in a direction oblique to the normal B direction of the input surface 6a and capture the image. In this case as well, the contrast of an obtained radiological image becomes high. A radiological image acquisition system 1D and an imaging unit 30D shown in FIG. 7(b) according to this modification differ from the radiological image acquisition system 1C and the imaging unit 30C in that the radiation source 2 and the imaging unit 30D are directed obliquely without changing the orientation of the conveying surface 21a. In other respects, the radiological image acquisition system 1D and the imaging unit 30D are the same as the radiological image acquisition system 1C and the imaging unit 30C. In a radiological image acquisition system 1E and an imaging unit 30E shown in FIG. 7(c), only the posture of the object A is tilted on the conveying surface 21a.

As shown in FIG. 8(a), the slit member 16 may be configured such that the width of the slit S in the conveying direction D decreases more toward the input surface 6a of the scintillator 6. In a radiological image acquisition system 1F and an imaging unit 30F, the pair of the first slit plate 17 and the second slit plate 18 which are placed in a tapered form serve to increase the opening of the slit member 16 to allow vertical incidence and oblique incidence of X-rays using one housing 15. An angle display device 40 may be installed in the housing 15 so as to allow easy visual recognition of an oblique incident angle. The 1× lens 7 and the line scan sensor 3 form the scintillation light output in the direction oblique to the normal B of the input surface 6a into an image and capture the image. Since the inlet portion of the slit S can be increased in this manner, it is possible to change the incident direction (incident angle) of radiation with respect to the input surface 6a of the scintillator 6 and guide radiation in a plurality of incident angles to the input surface 6a. For the oblique incidence of X-rays, for example, another entrance window 14g that allows radiation transmitted through the object A to pass through may be formed in the housing 15. The entrance window 14g can be formed in accordance with the placement of the second slit plate 18 (the tilted surface defining the slit S). An opening/closing mechanism may be provided to open/close the entrance windows 14f and 14g as needed. The opening/closing mechanism may operate in accordance with the imaging timing by the line scan sensor 3.

As shown in FIG. 8(b), the slit member 16, the 1× lens 7, and the line scan sensor 3 may be configured to be rotatable about an axis L extending along the input surface 6a in the housing 15. A radiological image acquisition system 1G and an imaging unit 30G according to this modification allow easy changing of the angle with respect to the input surface 6a by fixing the angle formed between the irradiation region 12 of the radiation source 2 and an optical axis E of the line scan sensor 3. Accordingly, a rotating mechanism 50 is provided, which can rotate the 1× lens 7 and the line scan sensor 3 about the axis L. That is, this makes it possible to easily change the incident direction (incident angle) of radiation with respect to the input surface 6a of the scintillator 6. For example, changing the incident direction of radiation and performing image capturing a plurality of times can improve the accuracy of various types of inspections.

As shown in FIG. 9(a), an imaging unit 30H may further include a cover member 43 that holds the slit member 16 and is detachably attached to the housing. In the radiological image acquisition system 1H and the imaging unit 30H, the slit member 16 is fixed to the cover member 43 having an L shape such that the slit S faces the normal B direction of the input surface 6a. Attaching an exchange unit 45H obtained by integrating the above components to the housing 15 makes it possible to perform image capturing similar to that shown in FIG. 4. Alternatively, as shown in FIG. 9(b), an imaging unit 30J may further include a cover member 44 that holds the slit member 16 and is detachably attached to the housing. In a radiological image acquisition system 1J and the imaging unit 30J according to this modification, the slit member 16 is fixed to the cover member 44 having an L shape such that the slit S faces a direction oblique to the normal B of the input surface 6a. Attaching an exchange unit 45J obtained by integrating the above components to the housing 15 makes it possible to perform image capturing similar to that shown in FIG. 5(b). Preparing a cover member and a plurality of types of parts to be combined with the slit member 16 held by the cover member in this manner and interchanging them as needed can easily change the incident direction (incident angle) of radiation with respect to the input surface 6a of the scintillator 6. For example, changing the incident direction of radiation and performing image capturing a plurality of times can improve the accuracy of various types of inspections.

Alternatively, as shown in FIGS. 10(a) to 10(c), image capturing may be performed by a combination of a radiological image acquisition system 1K and an imaging unit 30K arranged in the same manner as in FIG. 4, a radiological image acquisition system 1L and an imaging unit 30L arranged in the same manner as in FIG. 5(a), and a radiological image acquisition system 1M and an imaging unit 30M with the slit member 16 being placed symmetrically to that in the radiological image acquisition system 1L and the imaging unit 30L with respect to the normal B of the input surface 6a. That is, in the radiation output step, the object A is conveyed in the conveying direction D a plurality of times, and radiation is output to the object A from a plurality of different directions in the plurality of times of conveyance. In the radiation guiding step, in a plurality of times of conveyance, radiation may be guided to the input surface 6a of the scintillator 6 from a plurality of directions. In this case, the radiological image acquisition method may further include an image processing step of performing image processing for a plurality of captured images obtained in a scintillation light imaging step. Radiological images based on radiation guided (applied) from a plurality of directions become different images based on differences in angle. This makes it possible to improve the accuracy of various types of inspections. Combining more systems and units allows image capturing like CT imaging. The tube voltage may be changed by using different radiation sources 2, 2A.

Figure 11:
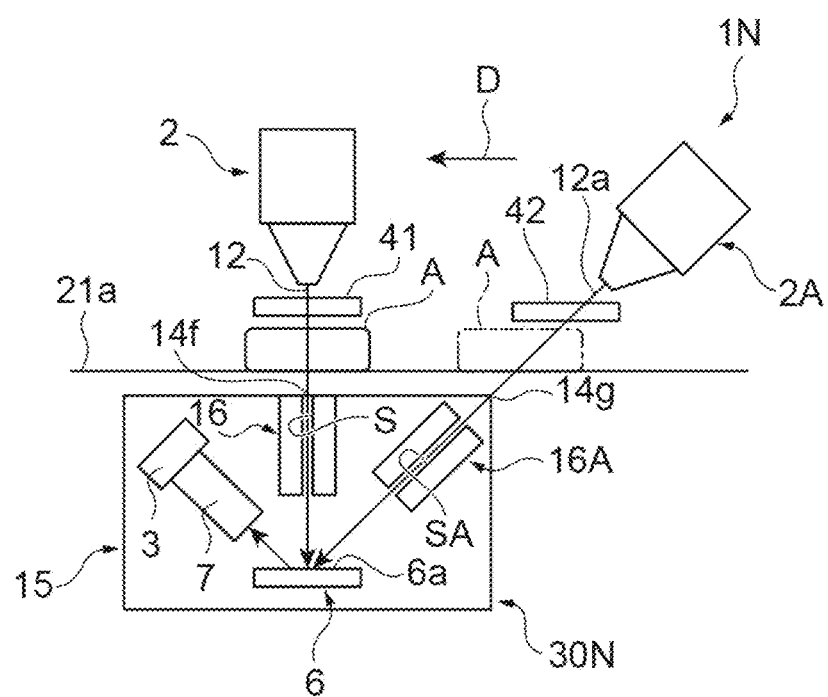
FIG. 11 is a view showing the placement of the respective units of a radiological image acquisition system according to a modification.

As shown in FIG. 11, the housing 15 has another entrance window 14g that allows radiation transmitted through the object A to pass through, with an imaging unit 30N being placed between the other entrance window 14g and the scintillator 6, and may further include another slit member 16A that forms another slit SA for guiding radiation transmitted through the other entrance window 14g to the input surface 6a. The slit member 16 and the other slit member 16A are arranged such that the slit S and the other slit SA guide radiation from two directions different from each other with respect to the input surface 6a of the scintillator 6. Radiological images based on the radiation guided (applied) from the two different directions become different images based on a difference in angle. This can improve the accuracy of various types of inspections. The inspection time can also be shortened by, for example, acquiring two types of images by one image capturing operation using mechanical shutters 41 and 42 formed from lead plates or the like. For example, the mechanical shutters 41 and 42 may be synchronized with the shutter of the line scan sensor 3. An opening/closing mechanism for opening/closing the entrance windows 14f and 14g. This opening/closing mechanism may operate in accordance with the opening/closing timing of the mechanical shutters 41 and 42 (the imaging capturing timing of the line scan sensor 3). Combining more components allows image capturing like CT imaging. The tube voltage may be changed by using different radiation sources 2, 2A.

Figure 12:
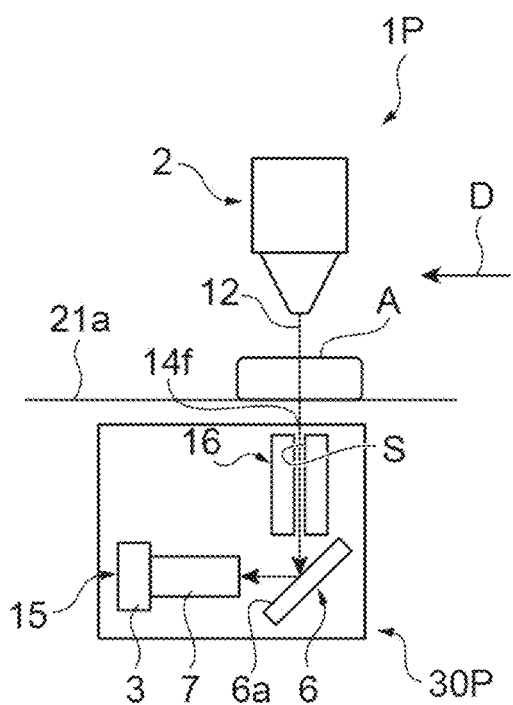
FIG. 12 is a view showing the placement of the respective units of a radiological image acquisition system according to a modification.

Further, as shown in FIG. 12, the scintillator 6 may be placed obliquely in the housing 15. In a radiological image acquisition system 1P and an imaging unit 30P according to this modification, the slit member 16 is placed such that the slit S is located in the direction oblique to the normal B of the input surface 6a of the scintillator 6. The 1× lens 7 and the line scan sensor 3 form the scintillation light output in the direction oblique to the normal B of the input surface 6a into an image and capture the image. This configuration also allows the 1× lens 7 and the line scan sensor 3 to be easily placed close to the input surface 6a.

As described above, it is known that different images are obtained by vertical incidence of X-rays and oblique incidence of X-rays. There are some that can be observed by vertical incidence, and there are some that cannot be observed by vertical incidence. The same applies to oblique incidence. In addition, different images are acquired if the incident angle (direction) of X-rays with respect to the object A differs at the time of oblique incidence. Performing image processing for these images will improve the accuracy of various types of inspections. Assuming that combinations of vertical incidence and oblique incidence can take various forms as indicated by the above modifications, almost infinite types of combinations can be implemented.

Figure 13:
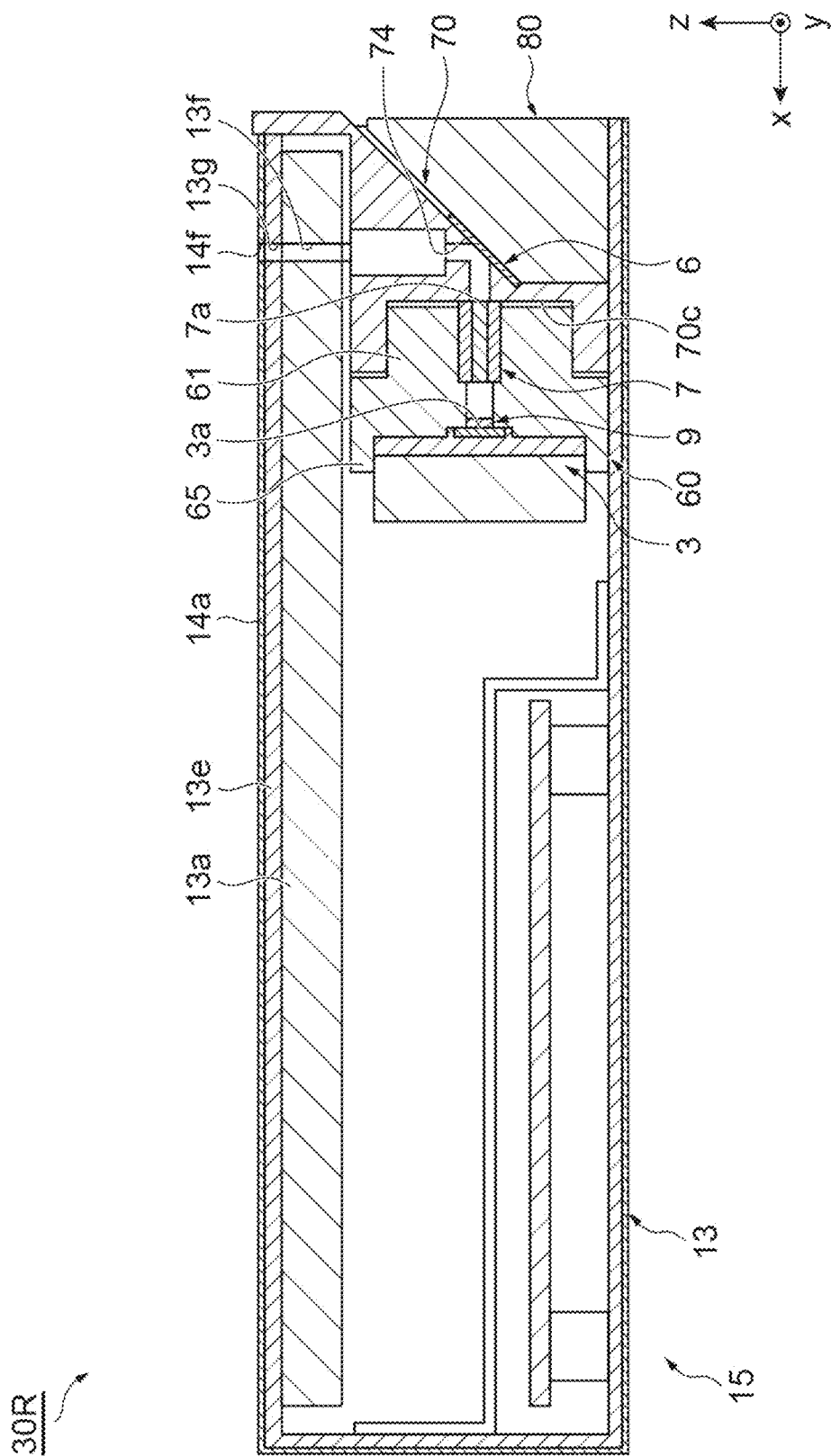
FIG. 13 is a sectional view showing an example of the internal configuration of an imaging unit corresponding to the modification shown in FIG. 12.
Figure 14:
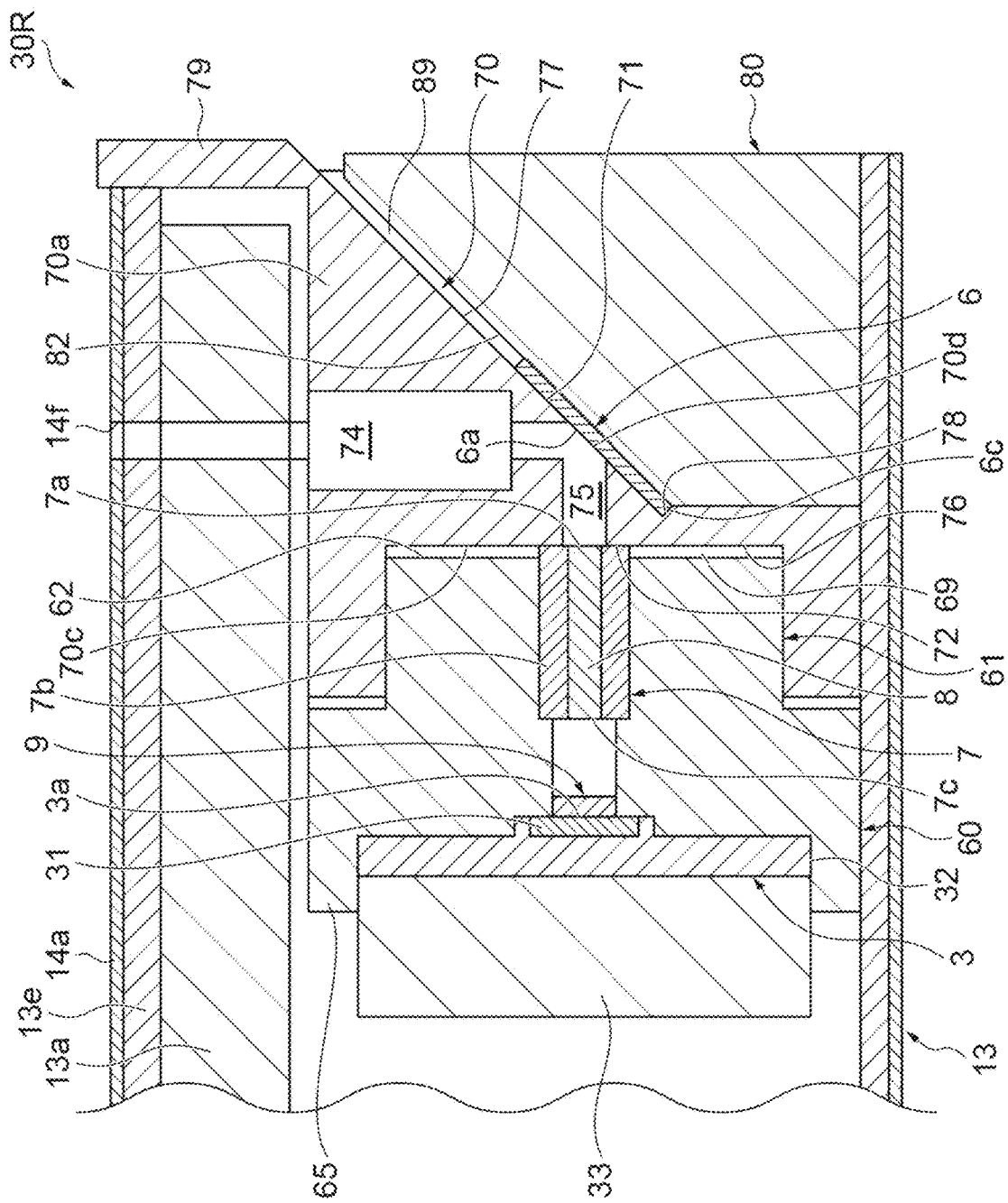
FIG. 14 is an enlarged sectional view of a part of FIG. 13.

A specific configuration example of an imaging unit 30R in which radiation enters from a direction oblique to the input surface 6a of the scintillator 6, and the 1× lens 7 and the line scan sensor 3 form the scintillation light output in a direction oblique to the input surface 6a into an image will be described with reference to FIGS. 13 and 14. FIG. 13 is a sectional view showing an internal configuration example of the imaging unit 30R. FIG. 14 is a partially enlarged sectional view of FIG. 13. The imaging unit 30R shown in FIG. 13 has the same configuration as that of the imaging unit 30P shown in FIG. 12 in terms of the entrance window 14f, the scintillator 6, radiation incident on the scintillator 6, and the placement of the 1× lens 7 and the line scan sensor 3.

The imaging unit 30R is configured to be able to capture an image of the scintillation light output from the input surface 6a of the scintillator 6 in a direction oblique to the input surface 6a. The scintillator 6, the line scan sensor 3, and the 1× lens 7 are installed in the housing 15. The 1× lens 7 is placed between the scintillator 6 and the line scan sensor 3. The imaging unit 30R has a structure for holding the scintillator 6, the line scan sensor 3, and the 1× lens 7 in a predetermined positional relationship.

As shown in FIGS. 13 and 14, the imaging unit 30R includes a holding member 60 that holds the 1× lens 7 and the line scan sensor 3, a positioning member 70 that positions the scintillator 6, and a support member 80 that is fitted in the positioning member 70 and supports the scintillator 6. The holding member 60, the positioning member 70, and the support member 80 are attached to the housing body 13 of the housing 15 and fixed at predetermined positions. The configurations of the scintillator 6, the line scan sensor 3, and the 1× lens 7 and a configuration for holding each of these components will be described below.

As shown in FIG. 13, the holding member 60 is accommodated in the housing body 13. The holding member 60 has a positioning portion 61 having a function as a guide. The holding member 60 holds the 1× lens 7 at the positioning portion 61 of the holding member 60 which faces the scintillator 6. In addition, the holding member 60 holds the line scan sensor 3 at a proximal end portion 65 on the opposite side to the positioning portion 61. The holding member 60 holds the 1× lens 7 such that, for example, the distal end face (one end face) 7a of the 1× lens 7 is orthogonal to the x direction. For example, the holding member 60 holds the line scan sensor 3 such that the imaging surface 3a of an imaging unit 31 is orthogonal to the x direction. As shown in FIG. 14, the imaging unit 31 of the line scan sensor 3 is held on a main body portion 32 attached on a base portion 33. Part of the base portion 33 and the main body portion 32 are fitted in the proximal end portion 65 of the holding member 60.

As shown in FIGS. 13 and 14, the positioning member 70 is incorporated in the housing body 13 at a position immediately below the entrance window 14f. The positioning member 70 is made of, for example, a metal such as copper. The positioning member 70 has a first through hole 74 through which radiation passes and a second through hole 75 through which the scintillation light converted by the scintillator 6 and output from the scintillator 6 passes. The first through hole 74 is formed along, for example, a y-z plane, and the second through hole 75 is formed along, for example, an x-y plane. The length of the first through hole 74 and the second through hole 75 in the y direction is larger than the length of the scintillator 6 in the y direction. The first through hole 74 communicates with the second through hole 75 through a space extending in the y direction. The positioning member 70 has an attachment surface 77 extending obliquely to the first through hole 74, that is, the radiation passage. The attachment surface 77 is tilted, for example, at 45° with respect to the x-y plane. The support member 80 presses the scintillator 6 against the attachment surface 77. The space in which the first through hole 74 communicates with the second through hole 75 opens to the attachment surface 77. The input surface 6a of the scintillator 6 faces an opening 70d. Setting the tilt angle of the attachment surface 77 as appropriate will determine the angle of the input surface 6a with respect to radiation input to the input surface 6a and the angle of the input surface 6a with respect to the imaging surface 3a. The tilt angle (45°) of the attachment surface 77 described above is merely an example. The attachment surface 77 may be tilted at another angle with respect to the x-y plane.

The first through hole 74 forms a slit serving as a radiation passage. The entrance window 14f of the top plate portion 14a, the through hole 13g of the support plate portion 13e, and the opening 13f of the upper wall portion 13a are arranged side by side in the z direction so as to have a predetermined length in the x direction. The first through hole 74 is aligned with the entrance window 14f, the through hole 13g, and the opening 13f. The first through hole 74 guides the X-rays passing through the entrance window 14f toward the input surface 6a of the scintillator 6. The positioning member 70 prevents X-rays in the internal space of the housing 15 from scattering. The X-rays (radiation) in the irradiation region 12 (see FIG. 12) which has passed through the first through hole 74 of the positioning member 70 is input to the input surface 6a of the scintillator 6.

Although the 1× lens 7 has a known configuration, an important feature portion in the imaging unit 30R will be described below. The 1× lens 7 has a rectangular parallelepiped shape. The 1× lens 7 has a structure in which, for example, many columnar lens bodies (lenses) 8 arranged in a line are held by a lens holding portion 7b. With the lens bodies 8 arranged in an array, the 1× lens 7 forms light into an image on the input surface 6a of the scintillator 6 and the imaging surface 3a of the line scan sensor 3. The distal end face 7a of the 1× lens 7 in the lens length direction and a proximal end face (other end face) 7c are parallel to each other and are formed into flat surfaces. Both end faces of the lens body 8 are exposed to the distal end face 7a and the proximal end face 7c and flush with both end faces of the lens holding portion 7b. The adjacent lens bodies 8 of the 1× lens 7 are arranged such that images overlap. Since the lens bodies 8 are arranged in an array, no brightness difference occurs at the central portion and end portions of the array, and no lens distortion occurs at the end portions. The operating distance on the distal end face 7a side of the 1× lens 7 and the operating distance on the opposite side respectively correspond to the distance between the input surface 6a and the distal end face 7a shown in FIG. 14 and the distance between the proximal end face 7c and the imaging surface 3a. That is, the conjugation length of the 1× lens 7 corresponds to the distance between the input surface 6a and the imaging surface 3a.

Referring back to FIG. 14, in the imaging unit 30R, the radiation passage formed by the first through hole 74 is placed obliquely to the normal direction of the input surface 6a of the scintillator 6. The 1× lens 7, the shielding member 9, and the line scan sensor 3 are arranged in a direction oblique to the normal direction of the input surface 6a. The 1× lens 7 forms the scintillation light output in the direction oblique to the normal direction of the input surface 6a into an image on the imaging surface 3a. The line scan sensor 3 captures the image of the scintillation light output in the direction oblique to the normal direction of the input surface 6a.

The shielding member 9 is, for example, a plate-like member provided on the line scan sensor 3 but may be a block-like member provided throughout the space between the imaging surface 3a of the line scan sensor 3 and the proximal end face 7c of the 1× lens 7. That is, a gap may or may not be formed between the shielding member 9 and the 1× lens 7.

The positioning member 70 has a locking plate portion 79 in contact with a side surface of the housing body 13 and a main body portion 70a placed in the housing body 13. The first through hole 74 and the second through hole 75 are formed in the main body portion 70a. The main body portion 70a is a slit member that is placed between the entrance window 14f and the scintillator 6 and forms a slit for guiding the radiation transmitted through the entrance window 14f toward the input surface 6a. For example, a rectangular recess portion 70c is formed in the main body portion 70a. The positioning portion 61 of the holding member 60 is fitted in the recess portion 70c. In this manner, in the housing body 13, the holding member 60 is fitted and fixed in the positioning member 70 fixed to the housing body 13.

The positioning member 70 has a first positioning portion 71 that positions the scintillator 6 by making the input surface 6a of the scintillator 6 come into contact with the first positioning portion 71. The first positioning portion 71 is formed as part of the attachment surface 77 described above and has a flat surface. The first positioning portion 71 comes into surface contact with the input surface 6a of the scintillator 6.

The support member 80 fitted in the positioning member 70 supports the scintillator 6. The support member 80 has a support surface 82 facing the attachment surface 77 on which the first positioning portion 71 is formed. The tilt angle of the support surface 82 is equal to the tilt angle of the attachment surface 77 and hence the support surface 82 is parallel to the attachment surface 77. The support member 80 holds the scintillator 6 between the attachment surface 77 and the support surface 82. The support member 80 is fixed to the positioning member 70 with an appropriate fixing means such as a screw such that an interval 89 (the distance in the normal direction of the support surface 82) between the attachment surface 77 and the support surface 82 can be adjusted.

The positioning member 70 has a second positioning portion 72 with which the distal end face 7a of the 1× lens 7 comes into contact to position the imaging surface 3a. The second positioning portion 72 is formed as part of a side surface 76 facing the holding member 60 and has a flat surface. The second positioning portion 72 comes into surface contact with, for example, the distal end face 7a of the 1× lens 7.

According to the imaging unit 30R, the positioning member 70 as a single member positions the scintillator 6 using the first positioning portion 71 and positions the 1× lens 7 using the second positioning portion 72. Since the input surface 6a of the scintillator 6 comes into contact with the first positioning portion 71, even if the scintillator 6 changes in thickness, for example, the position accuracy of the input surface 6a can be secured. This can maintain the distance between the line scan sensor 3 and the input surface 6a of the scintillator 6 constant. This configuration eliminates the necessity to consider the position accuracy of different members and hence is superior to conventional detectors. In addition, the distance between the input surface 6a of the scintillator 6 and the distal end face 7a of 1× lens 7 is maintained constant, and the accuracy of focal length (the operating distance of the 1× lens 7) is secured.

In the imaging unit 30R, the main body portion 70a of the positioning member 70 forms a slit for guiding radiation to the scintillator 6. There is no need to separately provide the slit member 16 (the first slit plate 17 and the second slit plate 18) described above and the like. That is, a slit is formed by the positioning member 70 that positions the input surface 6a of the scintillator 6 and also positions the distal end face 7a of the 1× lens 7. The second through hole 75 as the optical path of scintillation light is also formed. In addition, the holding member 60 that holds the line scan sensor 3 is positioned by being fitted in the positioning member 70. This makes it possible to easily implement a placement similar to that of the imaging unit 30P shown in FIG. 12.

Note that, in the imaging unit 30R shown in FIG. 13, a substrate and the like are arranged in a space expanding from the position of the line scan sensor 3 in the x direction (conveying direction D). However, even in the imaging unit 30R, the size of the housing body 13 in the z direction can be reduced. In addition, the layout of various members in the housing 15 can be changed in accordance with the application destination or installation place of the imaging unit, a desired surrounding layout, and the like.

In addition, a structure using at least the positioning member 70, the support member 80, or the holding member 60, that is, a structure similar to the imaging unit 30R, may be applied to each of the embodiments (the imaging units 30, 30A to 30H, 30J to 30N, and 30P) described above shown in FIGS. 1 to 12. When the positioning member 70 is used, the main body portion 70a of the positioning member 70 may form a slit for guiding radiation to the scintillator 6. In this case, the slit member 16 can be omitted.

A description of various modifications will be continued. For example, the range in which the slit member 16 is provided may be smaller than the range in the above embodiment and may be part of the range from the entrance window 14f to the input surface 6a of the scintillator 6.

The material used for the slit member 16 is not limited to the copper plate and includes, for example, aluminum, stainless steel, iron, and lead. The slit member 16 may be formed by covering the surface of aluminum, iron, stainless steel, or lead plate material with copper, for example, bonding copper foil or attaching a copper plate to the plate material. Alternatively, the slit member 16 may be formed from a plurality of materials. The same applies to the radiation source side slit member 26. Note that the radiation source side slit member 26 may be omitted. Copper has the property of suppressing the generation of scattered rays. Accordingly, using copper is advantageous in terms of scattered ray reduction and accompanying sensor noise reduction.

The shielding member 9 may be omitted. In this case, the 1× lens is directly attached to the line scan sensor 3. Note that, in the above embodiment, an image of scintillation light output from the input surface 6a of the scintillator 6 is captured. In addition, an image of scintillation light exiting from the surface of the scintillator 6 on the opposite side to the input surface 6a may be captured. In this case, the scintillator 6 may be constituted by a plurality of scintillators, and members for shielding against scintillation light may be inserted between the plurality of scintillators.

INDUSTRIAL APPLICABILITY

According to several aspects of the present disclosure, it is possible to improve the resolution and also improve the sensitivity.

Reference Signs List

1 . . . radiological image acquisition system, 3 . . . line scan sensor, 3a . . . imaging surface, 6 . . . scintillator, 6a . . . input surface, 7 . . . 1× lens, 9 . . . shielding member, 13 . . . housing body, 14 . . . lead cover, 14f . . . entrance window, 14g . . . another entrance window, 15 . . . housing, 16 . . . slit member, 16A . . . another slit member, 17 . . . first slit plate, 18 . . . second slit plate, 20 . . . conveying apparatus, 21a . . . conveying surface, 30 . . . imaging unit, 26 . . . radiation source side slit member, 70 . . . positioning member (slit member), B . . . normal (of input surface of scintillator), C . . . gap, D . . . conveying direction, E . . . optical axis (of line scan sensor), S . . . slit, SA . . . another slit

The invention claimed is:

1. An imaging unit for acquiring a radiological image of an object conveyed in a conveying direction, the imaging unit comprising:
a housing having an entrance window that allows radiation transmitted through the object to pass through;
a scintillator placed in the housing and having an input surface to which the radiation passing through the entrance window is input;
a line scan sensor placed in the housing and having an imaging surface that captures an image of scintillation light output from the input surface;
a slit member placed between the entrance window and the scintillator and configured to form a slit that guides the radiation passing through the entrance window toward the input surface; and
a 1×lens placed between the scintillator and the line scan sensor and configured to form the scintillation light output from the input surface into an image on the imaging surface of the line scan sensor.

2. The imaging unit according to claim 1, wherein the slit member is placed so as to locate the slit in a normal direction of the input surface of the scintillator, and
the 1× lens and the line scan sensor form the scintillation light output in a direction oblique to the normal direction of the input surface into an image and capture the image.

3. The imaging unit according to claim 1, wherein the slit member is placed so as to make the slit extend obliquely to the conveying direction.

4. The imaging unit according to claim 1, wherein the slit member is placed so as to locate the slit in a direction oblique to the normal direction of the input surface of the scintillator, and
the 1× lens and the line scan sensor form the scintillation light output in the direction oblique to the normal direction of the input surface into an image and capture the image.

5. The imaging unit according to claim 1, wherein the housing has another entrance window that allows radiation transmitted through the object to pass through,
the imaging unit further includes another slit member placed between the other entrance window and the scintillator and forms another slit that guides the radiation passing through the other entrance window toward the input surface, and
the slit member and the other slit member are placed so as to make the slit and the other slit respectively guide the radiation from two directions different from each other with respect to the input surface of the scintillator.

6. The imaging unit according to claim 1, further comprising a cover member configured to hold the slit member and be detachably attached to the housing.

7. The imaging unit according to claim 1, wherein the slit member is configured to make the slit decrease in width in the conveying direction toward the input surface of the scintillator.

8. The imaging unit according to claim 1, wherein the slit member, the 1× lens, and the line scan sensor are configured to be rotatable about an axis extending along the input surface in the housing.

9. A radiological image acquisition system that acquires a radiological image of an object, the radiological image acquisition system comprising:
a radiation source configured to output the radiation toward the object;
a conveying apparatus configured to convey the object in the conveying direction and allows radiation to pass through; and
the imaging unit defined in claim 1 which is installed so as to place the radiation source and the entrance window on the same plane.

10. The radiological image acquisition system according to claim 9, wherein the conveying apparatus and the slit member of the imaging unit are placed so as to make the slit extend obliquely to the conveying direction.

11. A radiological image acquisition method of acquiring a radiological image of an object, the radiological image acquisition method comprising:
a radiation output step of outputting radiation toward the object conveyed in a conveying direction;
a radiation guiding step of making the radiation transmitted through the object enter a housing through an entrance window and guiding the radiation toward an input surface of a scintillator using a slit formed in the housing;
a scintillation light output step of inputting the radiation passing through the slit to the input surface of the scintillator, converting the input radiation into scintillation light, and outputting the scintillation light from the input surface;
a scintillation light image forming step of forming the scintillation light output from the input surface into an image on an imaging surface of a line scan sensor using a 1× lens; and
a scintillation light imaging step of capturing an image of the scintillation light on the imaging surface of the line scan sensor.

* * * * *